US012745168B2

(12) United States Patent
Yue et al.

(10) Patent No.: US 12,745,168 B2
(45) Date of Patent: Sep. 22, 2026

(54) DISTRIBUTED MACHINE LEARNING OR FEDERATED LEARNING IN 5G CORE NETWORK

(71) Applicant: Telefonaktiebolaget LM Ericsson (publ), Stockholm (SE)

(72) Inventors: Jing Yue, Danderyd (SE); Zhang Fu, Stockholm (SE); Ulf Mattsson, Kungsbacka (SE); Mirko D'Angelo, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 18/845,884

(22) PCT Filed: Mar. 29, 2023

(86) PCT No.: PCT/IB2023/053135
§ 371 (c)(1),
(2) Date: Sep. 11, 2024

(87) PCT Pub. No.: WO2023/187679
PCT Pub. Date: Oct. 5, 2023

(65) Prior Publication Data

US 2025/0247776 A1 Jul. 31, 2025

Related U.S. Application Data

(60) Provisional application No. 63/325,380, filed on Mar. 30, 2022.

(51) Int. Cl.
*H04W 48/18* (2009.01)
*H04L 41/14* (2022.01)
(Continued)

(52) U.S. Cl.
CPC ........... *H04W 48/18* (2013.01); *H04L 41/145* (2013.01); *H04L 41/16* (2013.01); *H04W 24/06* (2013.01); *H04W 48/16* (2013.01)

(58) Field of Classification Search
CPC ..... H04W 48/18; H04W 24/06; H04W 48/16; H04L 41/145; H04L 41/16; G06N 3/098; G06N 20/00
See application file for complete search history.

(56) References Cited

U.S. PATENT DOCUMENTS

| | | | | |
|---|---|---|---|---|
| 2020/0112868 | A1* | 4/2020 | Shariat .................. | H04W 24/02 |
| 2020/0196155 | A1* | 6/2020 | Bogineni ............. | H04W 48/18 |

(Continued)

FOREIGN PATENT DOCUMENTS

| | | | |
|---|---|---|---|
| EP | 4 132 066 | A1 | 2/2023 |
| WO | 2021/032498 | A1 | 2/2021 |
| WO | 2021/218274 | A1 | 11/2021 |

OTHER PUBLICATIONS

International Search Report and Written Opinion received for PCT/IB2023/053135 mailed on Sep. 18, 2023.

(Continued)

*Primary Examiner* — Mohamed A. Wasel
(74) *Attorney, Agent, or Firm* — Sonoda & Kobayashi Intellectual Property Law; Sarvajit S. Patil

(57) ABSTRACT

In one embodiment, a method performed by a server Network Data Analytics Function (NWDAF) for selecting and reselecting one or more client NWDAFs includes transmitting, to each of a set of client NWDAFs, a preparation request for Distributed Machine Learning (DML) or Federated Learning (FL) and receiving, from each of at least some of the set of client NWDAFs, a response to the preparation request for DML or FL. The method further includes selecting one or more client NWDAFs based on the responses to the preparation requests for DML or FL. The method further
(Continued)

includes performing reselection of client NWDAFs responsive to determining that reselection of client NWDAFs is needed. In this manner, a core network of a mobile or cellular communications system is enabled to support DML or FL operations.

18 Claims, 13 Drawing Sheets

(51) Int. Cl.

| | |
|---|---|
| ***H04L 41/16*** | (2022.01) |
| ***H04W 24/06*** | (2009.01) |
| ***H04W 48/16*** | (2009.01) |

(56) References Cited

U.S. PATENT DOCUMENTS

| | | | | |
|---|---|---|---|---|
| 2022/0108214 | A1* | 4/2022 | Lee | H04W 48/18 |
| 2022/0294706 | A1 | 9/2022 | Norrman et al. | |
| 2023/0083982 | A1 | 3/2023 | Xin et al. | |
| 2023/0090022 | A1* | 3/2023 | Han | H04L 41/145 370/329 |
| 2023/0146099 | A1* | 5/2023 | Ouyang | H04L 41/16 709/223 |
| 2023/0300651 | A1* | 9/2023 | Kim | H04L 41/0894 370/252 |
| 2024/0056367 | A1* | 2/2024 | Samdanis | H04L 41/5067 |
| 2025/0047564 | A1* | 2/2025 | Zhang | H04L 41/14 |

OTHER PUBLICATIONS

3rd Generation Partnership Project; Technical Specification Group Services and System Aspects; Study on enablers for network automation for the 5G System (5GS); Phase 2 (Release 17), 3GPP TR 23.700-91 V17.0.0 (2929-12) Technical Specification.

3rd Generation Partnership Project; Technical Specification Group Services and System Aspects; Study of Enablers for Network Automation for 5G System (5GS); Phase 3 (Release 18), 3GPP TR 23.700-81 V0.1.0 (Mar. 2022), Technical Specification.

3rd Generation Partnership Project; Technical Specification Group Services and System Aspects; Architecture enhancements for 5G System (5GS) to support network data analytics services (Release 17), 3GPP TS 23.288 V17.3.0 (Dec. 2021), Technical Specification.

Qinbin Li et al., "A Survey on Federated Learning Systems: Vision, Hype and Reality for Data Privacy and Protection", IEEE Transactions on Knowledge and Data Engineering, Apr. 2023, pp. 3347-3366, vol. 35, DOI: 10.1109/TKDE.2021.3124599.

H. Brendan McMahan et al., "Communication-Efficient Learning of Deep Networks from Decentralized Data", Computer Science, arXiv:1602.05629 (cs), https://doi.org/10.48550/arXiv.1602.05629, Oct. 2016.

Shuyan et al., "Distributed Machine Learning for Wireless Communication Networks: Techniques, Architectures, and Applications," in IEEE Communications Surveys & Tutorials, vol. 23, No. 3, pp. 1458-1493, thirdquarter 2021, doi: 10.1109/COMST.2021.3086014. keywords: {Wireless communication; Wireless networks;Communication system security; Wireless sensor networks; Computer architecture; Servers; Security; Distributed machine learning;wireless communication networks; convergence;c et al., omputation and communication cost; architecture and platform; data.

Qiang Yang et al., "Federated Machine Learning: Concept and Applications", ACM Trans. Intell. Syst. Technol., vol. 10, No. 2, Article 12. Publication date: Feb. 2019, arXiv:1902.04885 (cs), https://doi.org/10.48550/arXiv.1902.04885.

Ji Liu et al., "From distributed machine learning to federated learning: a survey", Knowledge and Information Systems, vol. 64, pp. 885-917 (2022). https://doi.org/10.1007/s10115-022-01664-x.

International Bureau of WIPO, "International Preliminary Report on Patentability", received for PCT/IB2023/053135 mailed on Sep. 24, 2024.

Oppo: "KI#2, Sol#24: Update to clarify Federated Learning in 5GC", 3GPP Draft; S2-2006244, Sep. 2, 2024, XP051928778.

* cited by examiner

1100
NETWORK 1202
PROCESSING NODE 1200
PROCESSOR(S) 1204
FUNCTION(S) 1210
MEMORY 1206
NETWORK INTERFACE 1208
PROCESSING NODE 1200
PROCESSOR(S) 1204
FUNCTION(S) 1210
MEMORY 1206
NETWORK INTERFACE 1208
1116
1116
RADIO UNIT(S) 1110
TX(S) 1112
RX(S) 1114
CONTROL SYSTEM 1102
PROCESSOR(S) 1104
FUNCTION(S) 1210
MEMORY 1106
NETWORK INTERFACE 1108

DISTRIBUTED MACHINE LEARNING OR FEDERATED LEARNING IN 5G CORE NETWORK

CROSS-REFERENCE TO RELATED APPLICATIONS

This patent application is a submission under 35 U.S.C. § 371 for U.S. national stage patent application of international application no. PCT/IB2023/053135 filed on Mar. 29, 2023 and entitled "DISTRIBUTED MACHINE LEARNING OR FEDERATED LEARNING IN 5G CORE NETWORK," which claims priority to U.S. provisional application No. 63/325,380 filed on Mar. 30, 2022, the entireties of both of which are incorporated herein by reference.

RELATED APPLICATIONS

This application claims the benefit of provisional patent application Ser. No. 63/325,380, filed Mar. 30, 2022, the disclosure of which is hereby incorporated herein by reference in its entirety.

TECHNICAL FIELD

The present disclosure relates to a machine learning in a core network of a cellular communications system.

BACKGROUND

In Distributed Machine Learning (DML), the training process is carried out using distributed resources, which significantly accelerates the training speed and reduce the training time, as explained in J. Liu, J. Huang, Y. Zhou, X. Li, S. Ji, H. Xiong, and D. Dou, "From distributed machine learning to federated learning: A survey." arXiv preprint arXiv:2104.14362v2, May 10, 2021, which is hereinafter referred to as "the Liu Paper". DML can relieve congestion in wireless networks by sending a limited amount of data to central servers for a training task, while protecting sensitive information and preserving data privacy of the devices in wireless networks.

The Parameter Server (PS) framework is the key underlying architecture of centrally assisted DML. FIG. 1 is a reproduction of an architecture of the PS presented in the Liu Paper. As shown in FIG. 1, there are two kinds of nodes in the PS framework, i.e., a server node and a client (or worker) node. There may be one or multiple server nodes in the PS. The client nodes are partitioned into multiple groups. The server nodes in the PS maintain the whole or part of all parameters and aggregate the weights from each group of the client nodes. The client nodes conduct the initial steps of the learning algorithm. Unlike a centralized approach, a client node uses synchronized global gradients from the server node(s) to carry out back propagation and weight refreshments. The client nodes only share the parameters with the server nodes, and never communicate with other client nodes. The PS architecture has been broadly applied to decentralize ML tasks on wired platforms.

The existing studies on DML have been heavily focused on federated learning (FL), i.e., a popular architecture of DML for decentralized generation of generic ML models, its related technologies and protocols, and several application scenarios, as explained in S. Hu, X. Chen, W. Ni, E. Hossain, and X. Wang, "Distributed machine learning for wireless communication networks: Techniques, architectures, and applications." IEEE Communications Surveys & Tutorials, vol. 23, No. 3, Third Quarter 2021, which is hereinafter referred to as "the Hu Paper". As introduced in Q. Li, Z. Wen, Z. Wu, S. Hu, N. Wang, Y. Li, X. Lu, and B. He, "A survey of federated learning system: Vision, hype and reality for data privacy and protection." ar Xiv preprint arXiv: 1907.09693v6, Jul. 1, 2021, which is hereafter referred to as "the Li Paper," FL enables the collaborative training of ML models among different organizations under privacy restrictions. The main idea of FL is to build ML models based on data sets that are distributed across multiple devices while preventing data leakage, as explained Q. Yang, Y. Liu, T. Chen, and Y. Tong, "Federated machine learning: Concept and applications." arXiv preprint arXiv: 1902.04885v1, Feb. 13, 2019, which is hereinafter referred to as "the Yang Paper". In a FL system, multiple parties collaboratively train ML models without exchanging their raw data. The output of the system is a ML model for each party, which can be the same or different, as explained in the Li Paper.

There are three major components in an FL system: (1) parties (e.g., clients), (2) a manager (e.g., a server), and (3) a communication-computation framework to train the ML model, as explained in the third reference. The parties are the data owners and the beneficiaries of FL. The manager could be a powerful central server or one of the organizations who dominates the FL process under different settings. Computation happens on the parties and the manager, and communication happens between the parties and the manager. Usually, the aim of the computation is for model training, and the aim of the communication is for exchanging model parameters.

FIG. 2 shows a basic and widely used framework, 'Federated Averaging' (FedAvg), as explained in (H. McMahan, E. Moore, D. Ramage, S. Hampson, et al. "Communication-efficient learning of deep networks from decentralized data." arXiv preprint arXiv:1602.05629, 2016, which is hereinafter referred to as "the McMahan Paper". In each iteration, the process for FL is as follows.

First, the server sends a (current) global model to the selected parties.

Second, the selected parties update the global model with their local data.

Third, the updated models are sent back from the selected parties to the server.

Fourth, the server averages all the received local models to get (e.g., derive) a new global model. FedAvg repeats the above process until reaching a specified number of iterations. The global model of the server is the final output, which may be used by the parties, as explained in the third reference and the fourth reference.

In Third Generation Partnership Project (3GPP) Technical Report (TR) 23.700-91 v17.0.0, 2020-12 ("Study on enablers for network automation for the 5G System (5GS); Phase 2"), clause 6.24.1 ("Description") states that clause 6.24 ("Solution #24: Federated Learning among Multiple NWDAF Instances") is a solution based on FL among multiple Network Data Analytics Function (NWDAF) instances, which is given for "Key Issue #2: Multiple NWDAF instances and Key Issue #19: Trained data model sharing between multiple NWDAF instances." An excerpt from clause 6.24 of 3GPP TR 23.700-91 v17.0.0, 2020-12 is provided below.

Start of Excerpts from Clause 6.24 of 3GPP TR 23.700-91

6.24.1.1 General

As shown in FIG. 6.24.1.1-1, multiple NWDAF will be deployed in a big PLMN, so maybe it is difficult for NWDAF to centralize all the raw data that are distributed in different Areas. However, it is desired or reasonable for the NWDAF distributed in an Area to share its model or data analytics with others NWDAFs.

Reproduced as FIG. 3 of the Present Disclosure

FIG. 6.24.1.1-1: Hierarchical NWDAF Deployment in a PLMN

Federated Learning (also called Federated Machine Learning) could be a possible solution to handle the issues such as data privacy and security, model training efficiency, and so on, in which there is no need for raw data transferring (e.g. centralized into single NWDAF) but only need for model sharing. For example, with multiple level NWDAF architecture, NWDAFs may be co-located with an 5GC NF (e.g. UPF, SMF), and the raw data cannot be exposed due to privacy concerns and performance reasons. In such case, the federated learning will be a good way to let a Server NWDAF coordinate with multiple localized NWDAFs to complete a machine learning.

The main idea of Federated Learning is to build machine-learning models based on data sets that are distributed in different network functions. A Client NWDAF (e.g. deployed in a domain or network function) locally trains the local ML model with its own data and share it to the server NWDAF. With local ML models from different Client NWDAFs, the Server NWDAF could aggregate them into a global or optimal ML model or ML model parameters and send them back to the Client NWDAFs for inference.

This solution tries to involve the idea of Federated Learning into the NWDAF-based architecture, which aims to investigate the following aspects:

Registration and discovery of multiple NWDAF instances that support Federated Learning;

How to share the ML models or ML model parameters during the Federated Learning training procedure among multiple NWDAF instances.

6.24.1.2 General Procedure for Federated Learning among Multiple NWDAF Instances Reproduced as FIGS. 4A and 4B of the Present Disclosure FIG. 6.24.1.2-1: General procedure for Federated Learning Among Multiple NWDAF Instances 1-3. Client NWDAF registers its NF profile (Client NWDAF Type (see TS 23.502 clause 5.2.7.2.2), Address of Client NWDAF, Support of Federated Learning capability information, Analytics ID(s)) into NRF.

4-6. Server NWDAF discovers one or multiple Client NWDAF instances which could be used for Federated Learning via the NRF to get IP addresses of Client NWDAF instances by invoking the Nnrf_NFDiscovery_Request (Analytics ID, Support of Federated Learning capability information) service operation.

It is assumed an Analytics Id is preconfigured for a type of Federated Learning. Thus, the NRF can realize the Server NWDAF is requesting to perform federated learning based on the pre-configuration. And the NRF responds to the central NWDAF the IP address of multiple NWDAF instances which support the Analytics Id.

NOTE 1: The analytic ID(s) supporting Federated Learning can be configured by operator.

7a: Each client NWDAF communicates licensing conditions for its data and training infrastructure to participate in the federated learning task. These conditions can be based on policies set-up based on how sensitive the data is, how much compute is expected to be needed to perform local training, who will get the use the trained model, etc.

7b: Based on the response from NRF, Server NWDAF selects which NWDAF clients will participate based on its desired license model.

7c. Server NWDAF sends a request to the selected Client NWDAFs that participate in the Federated learning according to steps 7a and 7b including some parameters (such as initial ML model, data type list, maximum response time window, etc.) to help the local model training for Federated Learning.

8. Each Client NWDAF collects its local data by using the current mechanism in clause 6.2, TS 23.288.

9. During Federated Learning training procedure, each Client NWDAF further trains the retrieved ML model from the server NWDAF based on its own data, and reports the results of ML model training to the Server NWDAF, e.g. the gradiente.

NOTE 2: Server NWDAF interacts with Client NWDAF to deliver and update the ML model, and how to transfer the ML model and local ML model training results are up to the conclusion of KI #19.

10. The Server NWDAF aggregates all the local ML model training results retrieved at step 9 such as the gradient to update the global ML model.

11. The Server NWDAF sends the aggregated ML model information (updated ML model) to each Client NWDAF for next ground model training.

12. Each Client NWDAF updates its own ML model based on the aggregated model information (updated ML model) distributed by the Server NWDAF at step 11.

NOTE 3: The steps 8-12 should be repeated until the training termination condition (e.g. maximum number of iterations, or the result of loss function is lower than a threshold) is reached.

After the training procedure is finished, the globally optimal ML model or ML model parameters could be distributed to the Client NWDAFs for the inference.

End of Excerpt from Clause 6.24 of 3GPP TR 23.700-91

In regard to analytics aggregation from multiple NWDAFs, 3GPP Technical Specification (TS) 23.288 V17.3.0, 2021-12 ("Architecture enhancements for 5G System (5GS) to support network data analytics services"), clause 6.1A ("Analytics aggregation from multiple NWDAFs") discloses analytics service provided by NWDAFs exposure to NWDAF service consumer. An excerpt from clause 6.1A of 3GPP TS 23.288 V17.3.0, 2021-12 is provided below.

Start Excerpt from Clause 6.1A of 3GPP TS 23.288 V17.3.0

6.1A.1 General

In a multiple NWDAF deployment scenario, an NWDAF instance may be specialized to provide Analytics for one or more Analytics IDs. Each of the NWDAF instances may serve a certain Area of Interest or TAI(s).

Multiple NWDAFs may collectively serve the particular Analytics ID. An NWDAF may have the capability to support the aggregation of Analytics (per analytics ID) received from other NWDAFs, possibly with Analytics generated by itself.

The procedure for analytics aggregation from multiple NWDAFs is as defined in clause 6.1A.3.

6.1A.2 Analytics Aggregation

The analytics aggregation from multiple NWDAFs is used to address cases where an NWDAF service consumer requests Analytics ID(s) that requires multiple NWDAFs that collectively serve the request.

Aggregator NWDAF or aggregation point:

Is an NWDAF instance with additional capabilities to aggregate output analytics provided by other NWDAFs. This is in addition to regular NWDAF behaviour such as collecting data from other data sources to be able to generate its own output analytics.

Is able to divide the area of interest received from the consumer into sub area of interest based on the serving area of each NWDAF to be requested for data analytics, and then send data analytics requests including the sub area of interest as an Analytics Filter to corresponding NWDAFs. The Aggregator NWDAF may maintain information on the discovered NWDAFs, their supported Analytics IDs and NWDAF Serving Areas.

Has "analytics aggregation capability" registered in its NF Profile within the NRF.

Supports the requesting and exchange of "Analytics Metadata Information" between NWDAFs when required for the aggregation of output analytics.

"Analytics Metadata Information" is additional information associated with the requested Analytics ID(s) as defined in clause 6.1.3.

Supports dataset statistical properties, output strategy, and data time window parameters per type of analytics (i.e. analytics ID) as defined in clause 6.1.3.

NRF:

Stores the NF Profile of the NWDAF instances, including "analytics aggregation capability" for Aggregator NWDAFs and "analytics metadata provisioning capability" when supported by the NWDAF.

Returns the NWDAF(s) matching the attributes provided in the Nnrf_NFDiscovery_Request, as specified in clause 5.2.7.3 of TS 23.502.

NWDAF service consumer:

Requests or subscribes to receive analytics for one or more Analytic IDs in a given Area of Interest, as specified in clause 6.1 of the present document.

Uses the discovery mechanism from NRF as defined in clause 6.3.13 of TS 23.501 to identify NWDAFs with certain capabilities (e.g. Analytics aggregation), covering certain area of interest (e.g. providing data/analytics for specific TAI(s)).

Can differentiate and select the preferred NWDAF in case multiple NWDAFs are returned based on its internal selection criteria (possibly considering registered capabilities and information in NRF).

6.1A.3 Procedure for Analytics Aggregation 6.1.1A.3.1 Procedure for Analytics Aggregation with Provision of Area of Interest The procedure depicted in FIG. 6.1A.3-1 is used to address cases where an NWDAF service consumer requests Analytics ID(s) for an Area of Interest that requires multiple NWDAFs that collectively serve the request.

Reproduced as FIG. 5 of the Present Disclosure

FIG. 6.1A.3.1-1: Procedure for Analytics Aggregation 1a-b. NWDAF service consumer discovers the NWDAF via NRF. NRF may return multiple NWDAF candidates matching the requested capabilities, area of interest, and supported Analytics ID(s). NWDAF service consumer selects an NWDAF (e.g. NWDAF 1) with analytics aggregation capability (i.e. aggregator NWDAF), based on its internal selection criteria, possibly considering registered NWDAF capabilities and information in NRF.

2. NWDAF service consumer invokes Nnwdaf_AnalyticsInfo_Request or Nnwdaf_AnalyticsSubscription_Subscribe service operation from the selected aggregator NWDAF (e.g. NWDAF 1). In the request, NWDAF service consumer provides the requested Analytics ID(s), (e.g. Analytics ID 1) along with the required area of interest, e.g. TAI-1, TAI-2, TAI-n, if known to the NWDAF service consumer.

3. On receiving the request in step 2, Aggregator NWDAF (e.g. NWDAF 1), based on, e.g. configuration or queries to NRF, and considering the request from the NWDAF service consumer (e.g. analytics filter information), determines the other NWDAF instances that collectively can cover the area of interest indicated in the request (e.g. TAI-1, TAI-2, TAI-n).

NOTE: In the discovery request sent to NRF, Aggregator NWDAF may indicate "analytics metadata provisioning capability" (e.g. as query parameter), thus, requesting to NRF to reply back with, if available, those NWDAF instance(s) which also supports "analytics metadata provisioning capability" functionality as indicated during particular NWDAF instance registration procedure.

4-5. Aggregator NWDAF (e.g. NWDAF 1) invokes Nnwdaf_AnalyticsInfo_Request or Nnwdaf_AnalyticsSubscription_Subscribe service operation from each of the NWDAFs discovered/determined in step 3 (e.g. NWDAF 2 and NWDAF 3).

The request may optionally indicate "analytics metadata request" parameter to the determined NWDAFs (e.g. NWDAF 2 and/or NWDAF 3), when analytics metadata is supported by these NWDAFs.

The request or subscription to the determined NWDAFs (e.g. NWDAF 2 and/or NWDAF 3) may also include the dataset statistical properties, output strategy, and data time window. This indicates to the determined NWDAFs that the analytics ID output shall be generated based on such parameters when requested.

6-7a-b. The determined NWDAFs (e.g. NWDAF 2 and/or NWDAF 3) reply or notify with the requested output analytics.

If "analytics metadata request" was included in the request received by such NWDAF (in steps 4-5), the NWDAF additionally returns the "analytics metadata information" used for generating the analytics output as defined in clause 6.1.3.

8. Aggregator NWDAF (e.g. NWDAF 1) aggregates received Analytics information, i.e. generates a single output analytics based on the multiple analytics outputs and, optionally, the "analytics metadata information" received from the determined NWDAFs (e.g. NWDAF 2 and NWDAF 3).

The Aggregator NWDAF (e.g. NWDAF 1) may also take its own analytics for TAI-n into account for the analytics aggregation.

9a-b. Aggregator NWDAF (e.g. NWDAF 1) sends a response or notifies to the NWDAF service consumer the aggregated output analytics for the requested analytics ID.

End Excerpt from Clause 6.1A of 3GPP TS 23.288 V17.3.0

SUMMARY

Systems and methods are disclosed that related to Distributed Machine Learning (DML) or Federated Learning (FL) in core network of a mobile or cellular communications system. In one embodiment, a method performed by a server Network Data Analytics Function (NWDAF) for selecting one or more client NWDAFs comprises transmitting, to each of a set of client NWDAFs, a preparation request for DML or FL and receiving, from each of at least some of the set of client NWDAFs, a response to the preparation request for DML or FL. The method further comprises selecting one or more client NWDAFs based on the responses to the preparation requests for DML or FL. In this manner, the network is enabled to support DML or FL operations.

In one embodiment, the method further comprises registering a profile of the server NWDAF into a registry. In one embodiment, the registry is a Network Repository Function (NRF). In one embodiment, the profile comprises any one or more of: (a) a capability of computation and communication, (b) supported analytics identification(s), (c) Machine Learning (ML) relevant capability, (d) available data, or (c) availability to join in DML or FL. In one embodiment, the server NWDAF is discovered from the registry based on one of more of (i) a requirement on capability, (ii) a capability of model aggregation, (iii) a capability of processing and/or aggregating heterogenous model parameters, (iv) a capability to communication with other NWDAFs, (v) a capability of providing model to other NWDAFs or running models from other NWDAFs, of (vi) an indication of online or offline learning.

In one embodiment, the method further comprises discovering the set of client NWDAFs from the registry, based on any one or more of: (a) a requirement on capability, (b) an analytics identification, (c) an output strategy for intermediate results report during a training process, (d) a requirement on capability of processing intermediate ML models, results, and/or parameters, (c) a capability of running models from other NWDAFs, (f) an indication of online or offline learning, or (g) data source.

In one embodiment, the response to the preparation request comprises a result of performing one or more test tasks at the client NWDAF. In one embodiment, the preparation request for DML or FL comprises the one or more test tasks. In one embodiment, the result of performing the one or more test tasks at the client NWDAF comprises time and resource usage for completing the one or more test tasks, resource and energy consumption for completing the one or more test tasks, accuracy, or any combination of two or more thereof.

Corresponding embodiments of a server NWDAF are also disclosed.

In one embodiment, a network node for implementing a server NWDAF for selecting one or more client NWDAFs comprises processing circuitry configured to cause the network node to transmit, to each of a set of client NWDAFs, a preparation request for DML or FL and receive, from each of at least some of the set of client NWDAFs, a response to the preparation request for DML or FL. The processing circuitry is further configured to cause the network node to select one or more client NWDAFs based on the responses to the preparation requests for DML or FL.

In one embodiment, a method performed by a client NWDAF for exchanging signals with a server NWDAF comprises receiving, from the server NWDAF, a preparation request for DML or FL and deciding to join the DML or FL based on one or more parameters. The method further comprises performing one or more test tasks related to the DML or FL responsive to deciding to join the DML or FL and sending, to the server NWDAF, a result of the performing of the one or more test tasks.

In one embodiment, the result of performing the one or more test tasks comprises time usage for completing the one or more test tasks, computation resource usage for completing the one or more test tasks, energy consumption for completing the one or more test tasks, accuracy, or any combination of two or more thereof.

In one embodiment, the one or more test tasks are included in the request for preparing DML or FL.

In one embodiment, the one or more test tasks are micro computation tasks or training tasks.

In one embodiment, the one or more parameters comprise any one or more of: (a) willingness and availability to join in the DML or FL, (b) information about the DML or FL, (c) available computation resources, communication resources, and energy, (d) supported analytics identification, (e) ML relevant capability, or (f) available data.

Corresponding embodiments of a client NWDAF are also disclosed.

In one embodiment, a network node for implementing a client NWDAF for exchanging signals with a server NWDAF comprises processing circuitry configured to cause the network node to receive, from the server NWDAF, a preparation request for DML or FL and decide to join the DML or FL based on one or more parameters. The processing circuitry is further configured to cause the network node to perform one or more test tasks related to the DML or FL responsive to deciding to join the DML or FL and send, to the server NWDAF, a result of the performing of the one or more test tasks.

In one embodiment, a method performed by a NWDAF for performing a reselection of one or more client NWDAFs comprises, during an execution phase of DML or FL between the server NWDAF and the one or more client NWDAFs, monitoring an updated status of each of the one or more client NWDAFs, determining whether reselection of client NWDAFs is needed based on the updated statuses of the one or more client NWDAFs, and performing reselection of client NWDAFs responsive to determining that reselection of client NWDAFs is needed.

In one embodiment, the updated status of at least one client NWDAF from among the one or more client NWDAFs indicates that the at least one client NWDAF is chooses to leave the DML or FL or is not available for the DML or FL and performing reselection of client NWDAFs comprises sending, to the at least one client NWDAF, a terminate request. In one embodiment, performing reselection of client NWDAFs further comprises performing client NWDAF discovery for discovery of one or more new client NWDAFs. In one embodiment, performing client NWDAF discovery for discovery of one or more new client NWDAFs comprises transmitting, to each of a set of client NWDAFs, a preparation request for DML or FL, receiving, from each of at least some of the set of client NWDAFs, a response to the preparation request for DML or FL, and selecting the one or more new client NWDAFs from the set of client NWDAFs based on the responses to the preparation requests for DML or FL. In one embodiment, the response to the preparation request comprises a result of performing one or more test tasks at the client NWDAF. In one embodiment, the preparation request for DML or FL comprises the one or more test tasks. In one embodiment, the result of performing the one or more test tasks at the client NWDAF comprises time and resource usage for completing the one or more test tasks, resource and energy consumption for completing the one or more test tasks, accuracy, or any combination of two or more thereof.

In one embodiment, each of the updated statuses comprises any one or more of: (i) change of willingness and availability, (ii) change of ML relevant capability, (iii) change of supported analytics identification, (iv) change of the available computation resource, (v) change of computation capability, (vi) change of communication quality, (vii) change of the available energy, or (viii) change of data availability.

In one embodiment, monitoring the updated status of each of the one or more client NWDAFs comprises receiving the updated status of each of the one or more client NWDAFs from a Network Repository Function (NRF) and/or NWDAF.

In one embodiment, a method performed by a server NWDAF for performing a reselection of one or more client NWDAFs comprising, during an execution phase of DML or FL between the server NWDAF and the one or more client NWDAFs, monitoring an updated status of each of the one or more client NWDAFs and determining whether reselection of client NWDAFs is needed based on the updated statuses of the one or more client NWDAFs. The method further comprises sending a terminate request to at least one client NWDAF from among the one or more client NWDAFs for which the respective updated status indicates that the at least one client NWDAF chooses to leave the DML or FL or is not available for the DML or FL. The method further comprises sending, to each of a new set of client NWDAFs, a preparation request for DML or FL, receiving, from each of at least some of the new set of client NWDAFs, a response to the preparation request for DML or FL comprising a result of performing one or more test tasks at the client NWDAF, and selecting one or more new client NWDAFs from the new set of client NWDAFs based on the responses to the preparation requests for DML or FL.

In one embodiment, the preparation request for DML or FL comprises the one or more test tasks.

In one embodiment, the result of performing the one or more test tasks at the client NWDAF comprises time and resource usage for completing the one or more test tasks, resource and energy consumption for completing the one or more test tasks, accuracy, or any combination of two or more thereof.

In one embodiment, each of the updated statuses comprises any one or more of: (i) change of willingness and availability, (ii) change of ML relevant capability, (iii) change of supported analytics identification, (iv) change of the available computation resource, (v) change of computation capability, (vi) change of communication quality, (vii) change of the available energy, or (viii) change of data availability.

In one embodiment, monitoring the updated status of each of the one or more client NWDAFs comprises receiving the updated status of each of the one or more client NWDAFs from a NRF and/or NWDAF.

In one embodiment, a network node for implementing a server NWDAF for performing a reselection of one or more client NWDAFs comprises processing circuitry configured to cause the network node to, during an execution phase of DML or FL between the server NWDAF and the one or more client NWDAFs, monitor an updated status of each of the one or more client NWDAFs, determine whether reselection of client NWDAFs is needed based on the updated statuses of the one or more client NWDAFs, and perform reselection of client NWDAFs responsive to determining that reselection of client NWDAFs is needed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
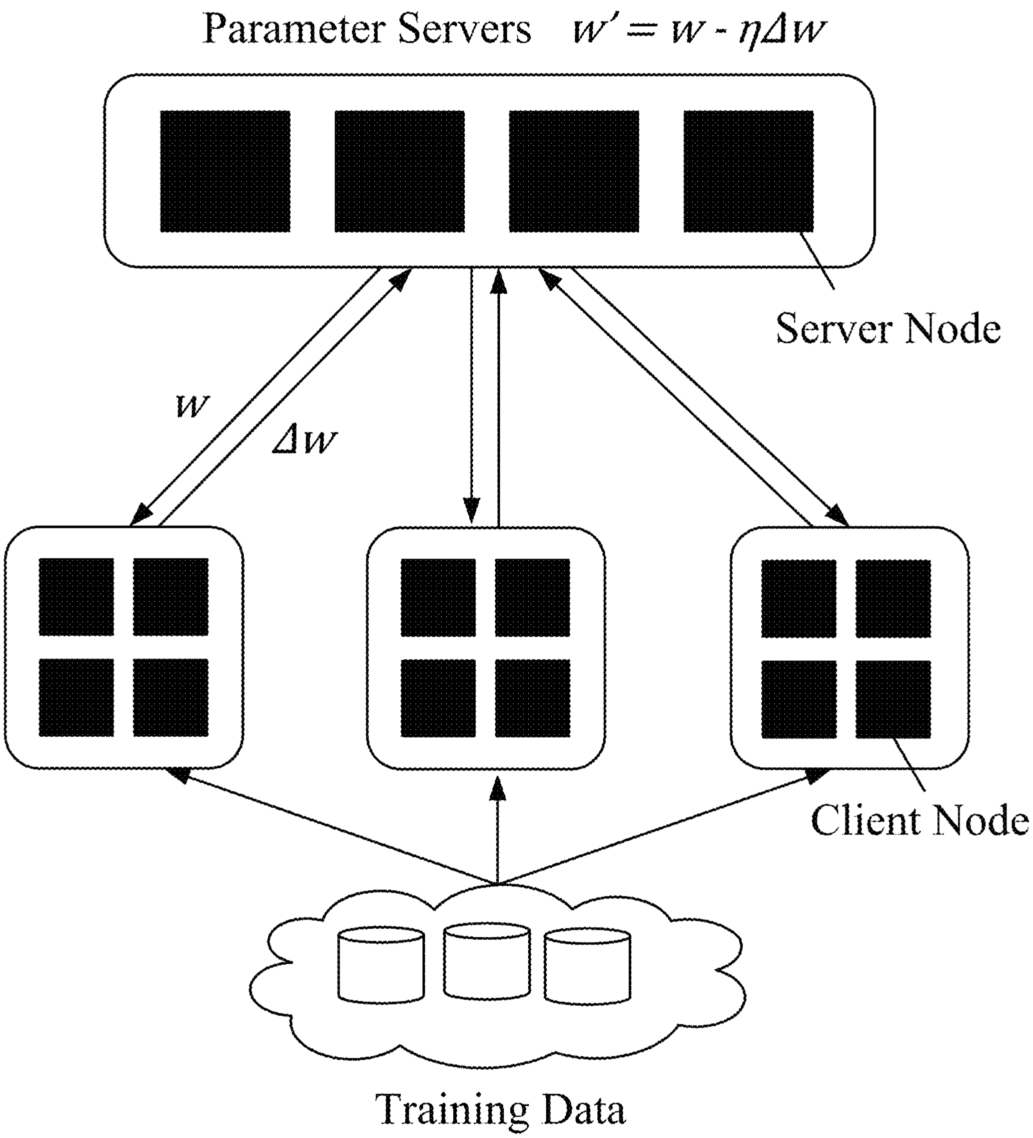
FIG. 1 is a reproduction of an architecture of a Parameter Server (PS) presented in the Liu Paper.
Figure 2:
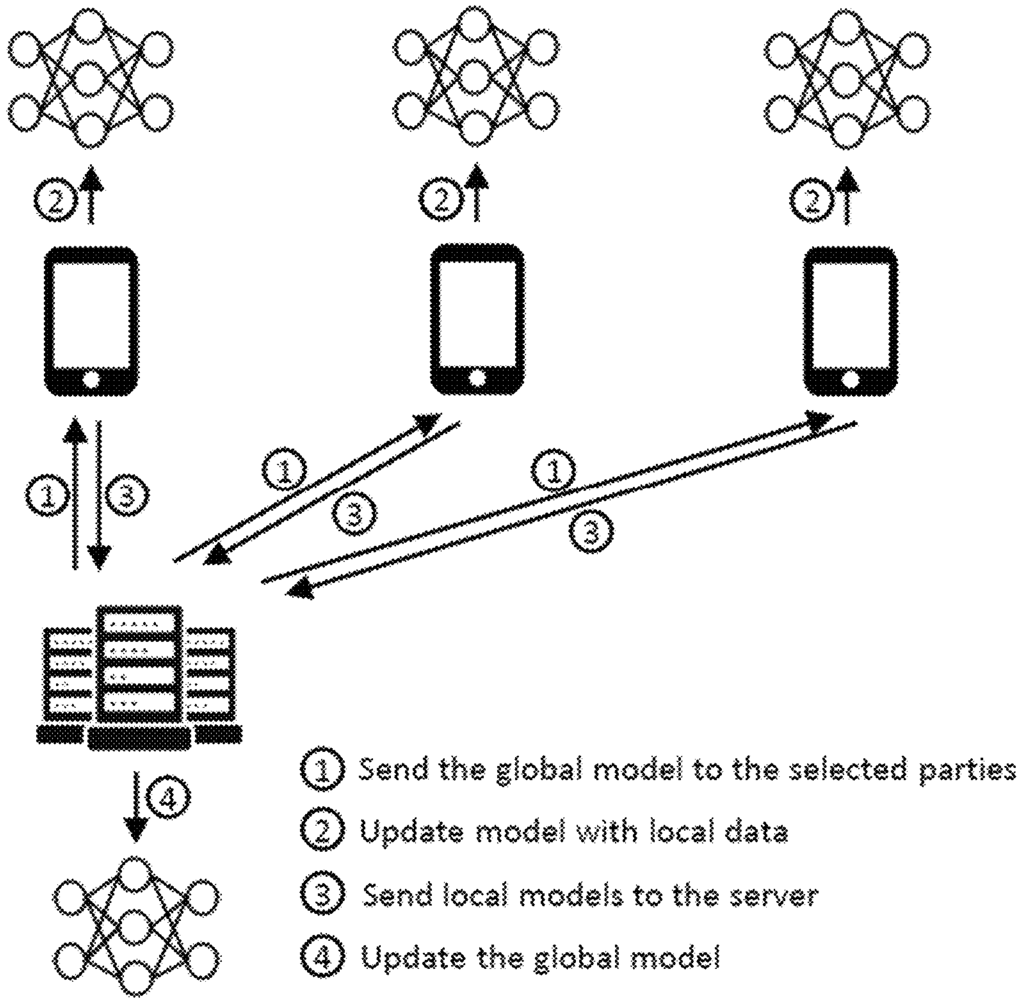
FIG. 2 shows a basic and widely used framework, 'Federated Averaging' (FedAvg)
Figure 3:
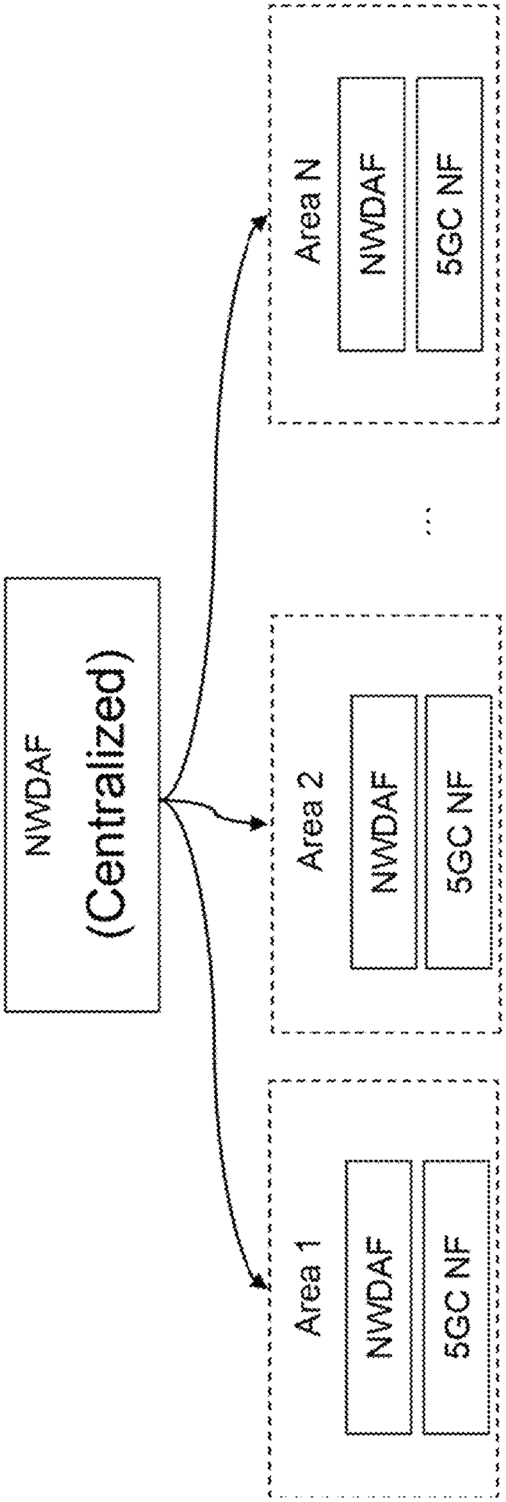
FIG. 3 is a reproduction of FIG. 6.24.1.1-1 from Clause 6.24 of 3$^{rd}$ Generation Partnership Project (3GPP) Technical Report (TR) 23.700-91.
Figure 4A:
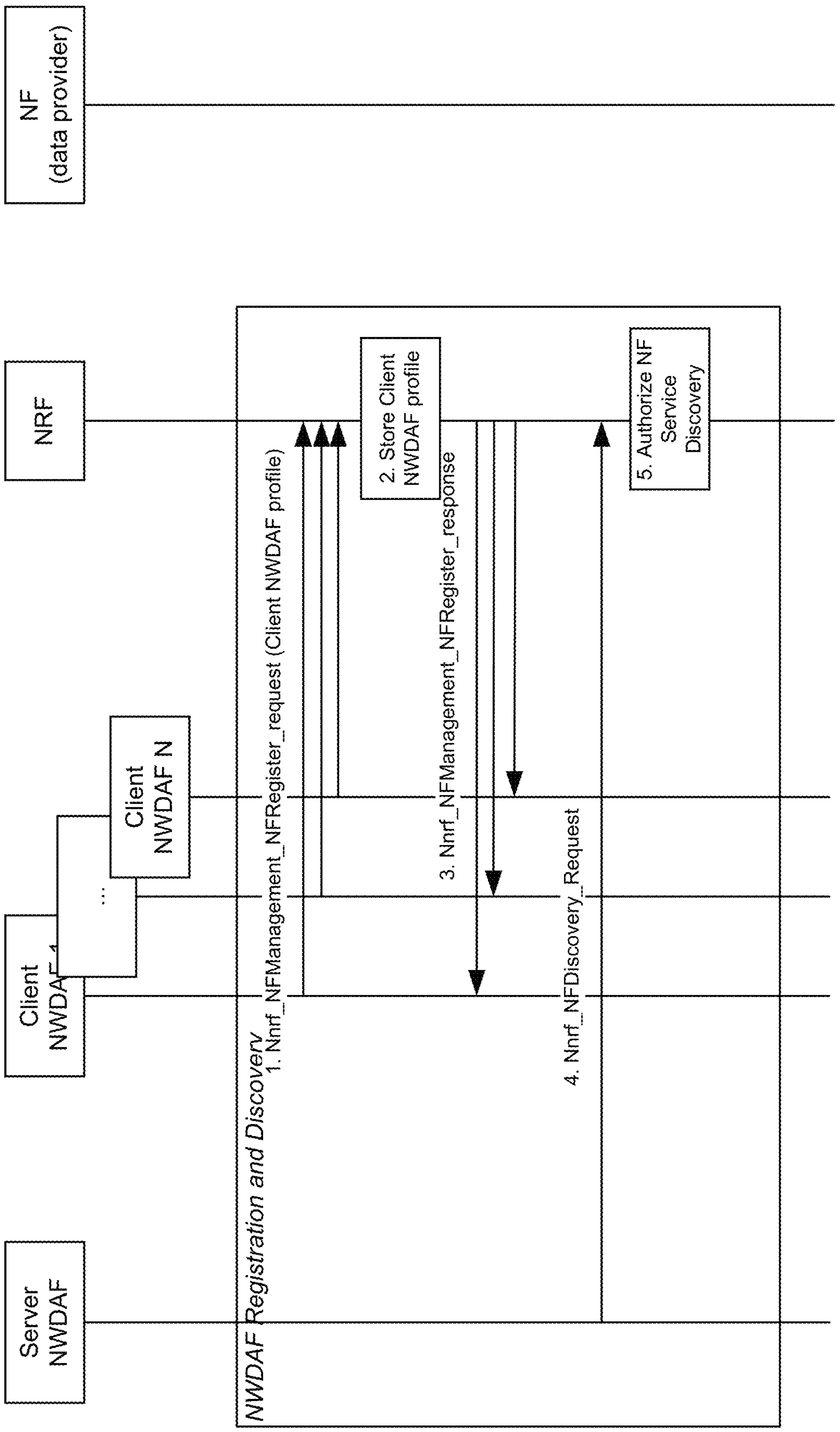
FIGS. 4A and 4B are a reproduction of FIG. 6.24.1.1-2 from Clause 6.24 of 3GPP TR 23.700-91.
Figure 4B:
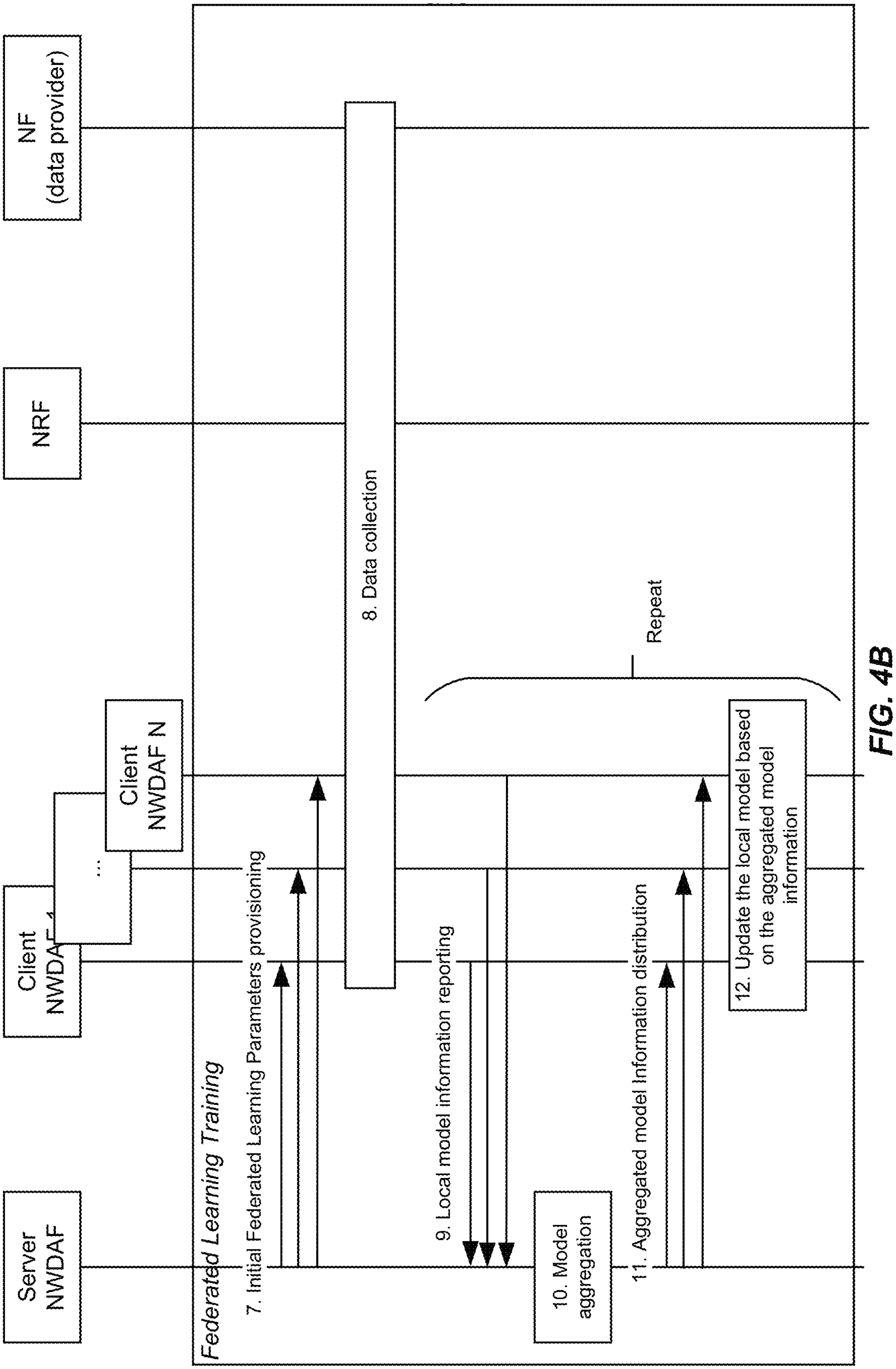
Figure 5:
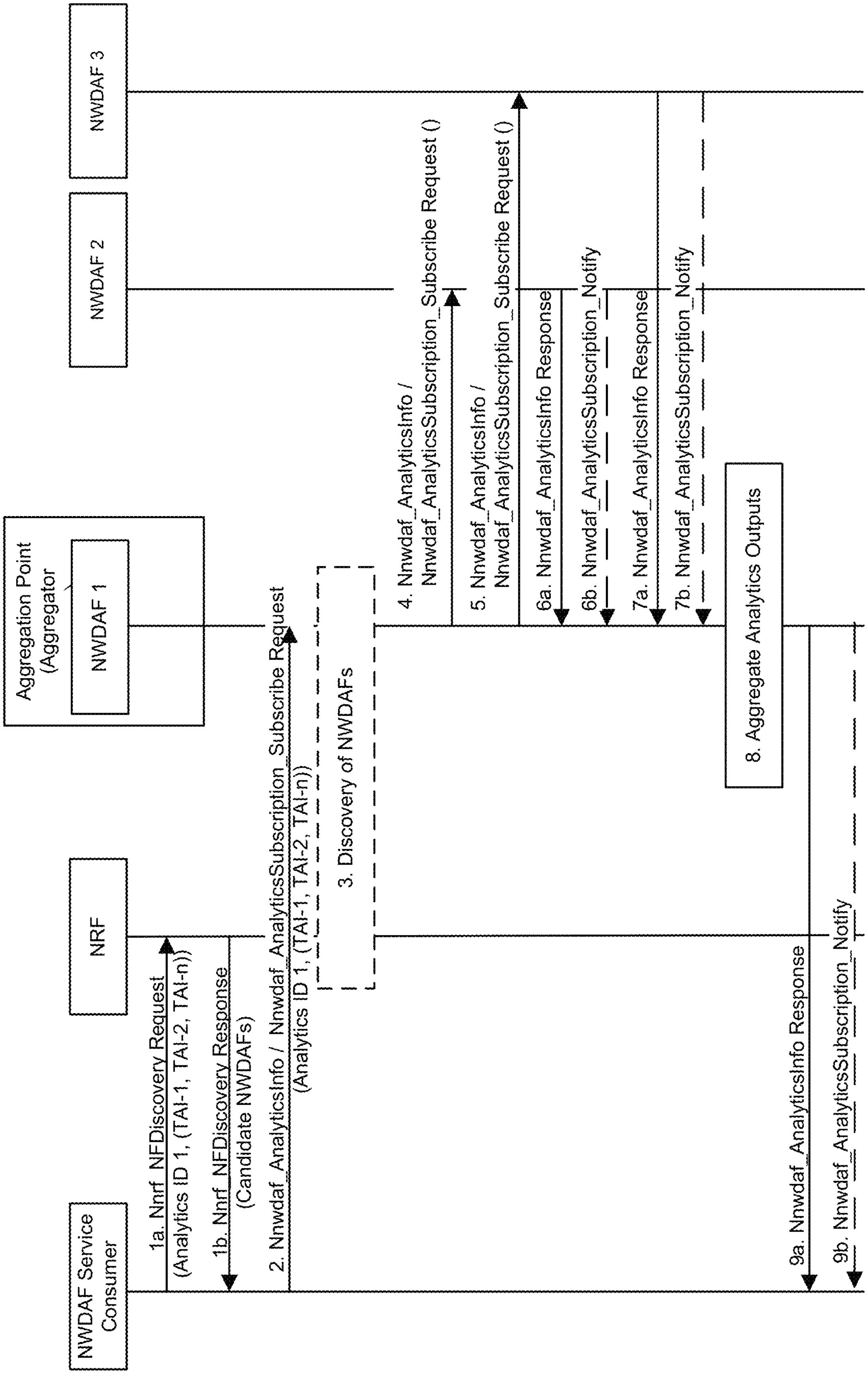
FIG. 5 is a reproduction of FIG. 6.1A.3.1-1 from Clause 6.1A of 3GPP TS 23.288 V17.3.0.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The Key Issue #8 (Supporting Federated Learning in $5^{th}$ Generation Mobile Network Core Network Core (5GC)) in 3GPP Technical Report (TR) 23.700-81 V0.1.0 2022-03 ("Study on Enablers for Network Automation for 5G; Phase 3") for eNA_Ph3 raises the following study aspects for architecture enhancement to support Federated Learning (FL) and allows the cooperation of multiple Network Data Analytic Functions (NWDAFs) (i.e., multiple NWDAF instances) containing a Model Training Logical Function (MTLF) to train a Machine Learning (ML) model in 3GPP network: (1) study the registration and discovery of the NWDAF supporting FL; (2) study how to coordinate multiple NWDAFs including selection of participant NWDAF instances in the FL group, e.g., assistance information (if any) to perform the selection, and decision of role for the participant NWDAF; and (3) study whether and how to perform (e.g. network performance and model performance) monitoring of the NWDAF FL operation.

A lot of factors influence NWDAF registration, discovery, and (Server and Client) NWDAFs selection in the Distributed Machine Learning (DML)/FL preparation phase. Some example factors include the capability of an NWDAF to be selected as Server or Client NWDAF(s) and the willingness and availability of Client NWDAF(s) to join in DML/FL. In addition to these aspects, the interaction between Server and Client NWDAFs for performing DML/FL operations needs to be taken into consideration. In the DML/FL execution phase, different methods may be applied for the Server NWDAF to monitor the status changes of the Client NWDAF(s). In addition, a lot of factors influence NWDAF monitoring and Client NWDAF(s) re-selection, e.g., the changes of capability, willingness, and availability, etc. at the Client NWDAF(s).

The above factors are not yet considered and implemented in the current 3GPP specifications (e.g., 3GPP TS 23.288 V17.3.0, 2021-12). Hence, the present disclosure proposes mechanisms for NWDAF(s) registration, discovery, and monitoring for DML/FL in 5GC as well as mechanisms for Client NWDAF(s) selection and re-selection for DML/FL in 5GC.

Certain aspects of the present disclosure and their embodiments may provide solutions to the aforementioned or other challenges. The present disclosure proposes mechanisms for NWDAF registration, discovery, and selection at DML/FL preparation phase in 5GC. The capability and availability of NWDAFs for DML/FL are considered during the registration and discovery procedures. In addition, factors on cost (e.g., resource consumption and energy consumption) for performing DML/FL tasks are considered for Client NWDAF selection. The following procedures for NWDAF registration, discovery, and selection, and the interactions between Server and Client NWDAFs in the DML/FL preparation phase are given: (1) procedure for NWDAF registration, (2) procedure for Server and Client NWDAFs discovery, (3) procedure for Client NWDAF(s) selection.

The present disclosure also proposes mechanisms for monitoring and re-selecting Client NWDAF(s) at DML/FL execution phase in 5GC. The changes of capability and availability of Client NWDAF(s) for joining in DML/FL are considered during the monitoring and re-selection procedures. In addition, factors on cost (e.g., resource consumption and energy consumption) for perform DML/FL tasks are considered for Client NWDAF re-selection. The following procedures for monitoring and re-selection of Client NWDAF(s) in the DML/FL execution phase are also given: (A) procedure for monitoring the Client NWDAF(s) and (B) procedure for Client NWDAF(s) update or re-selection.

Certain embodiments may provide one or more of the following technical advantages. The proposed procedures allow life-cycle management of DML/FL operations in 5GC and hence enhance the capabilities of the network supporting ML operations.

Figure 6:
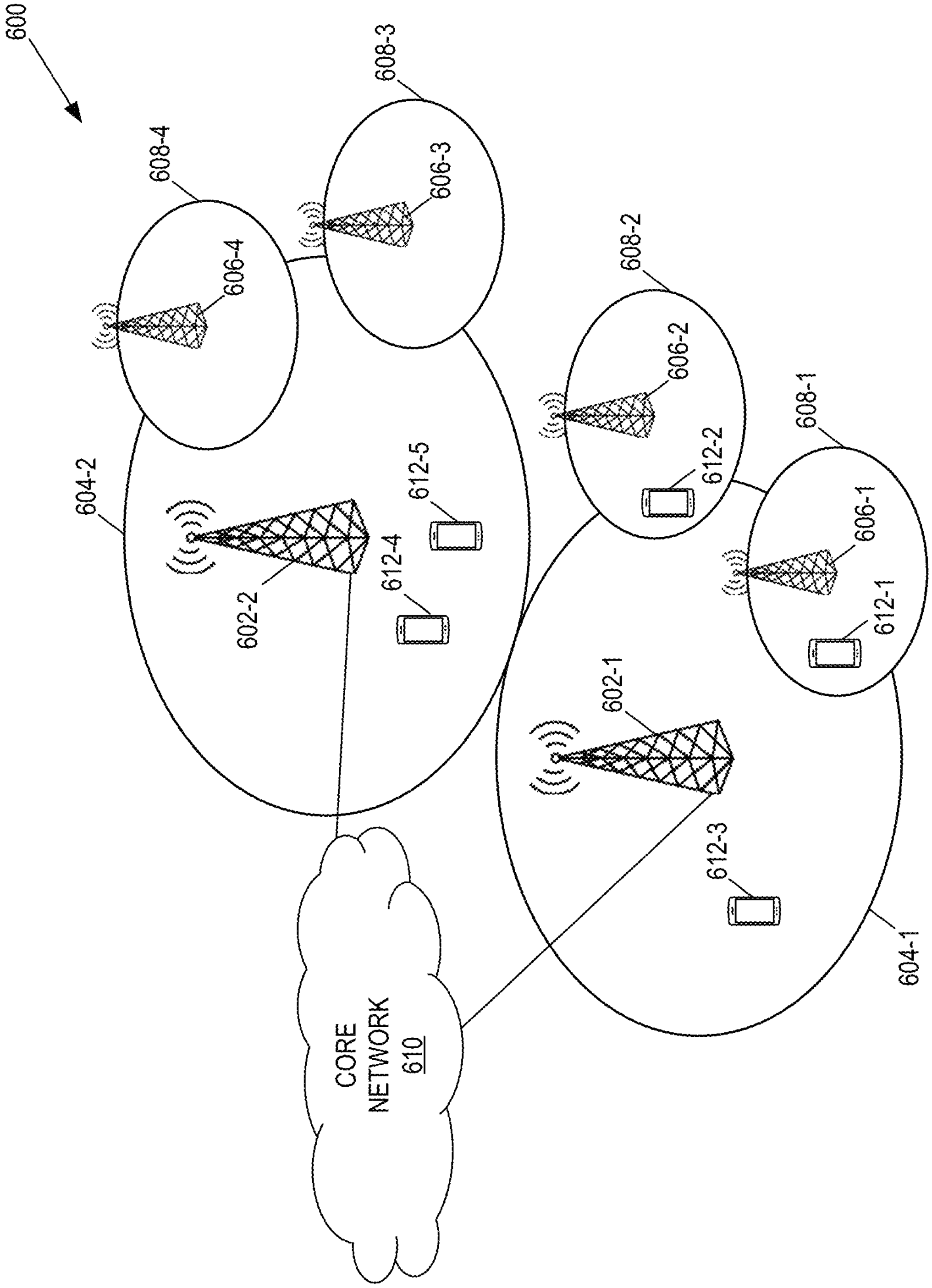
FIG. 6 illustrates one example of a cellular communications system in which embodiments of the present disclosure may be implemented.

FIG. 6 illustrates one example of a cellular communications system 600 in which embodiments of the present disclosure may be implemented. In the embodiments described herein, the cellular communications system 600 is a 5G system (5GS) including a Next Generation RAN (NG-RAN) and a 5GC; however, embodiments of the present disclosure are also applicable for other types of cellular communications systems such as an Evolved Packet System (EPS) including an Evolved Universal Terrestrial RAN (E-UTRAN) and an Evolved Packet Core (EPC) and furture systems supporting federated learning such as $6^{th}$ Generation (6G) and beyond. In this example, the RAN includes base stations 602-1 and 602-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or RRHs, or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5GS is referred to as the 5GC. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

Figure 7:
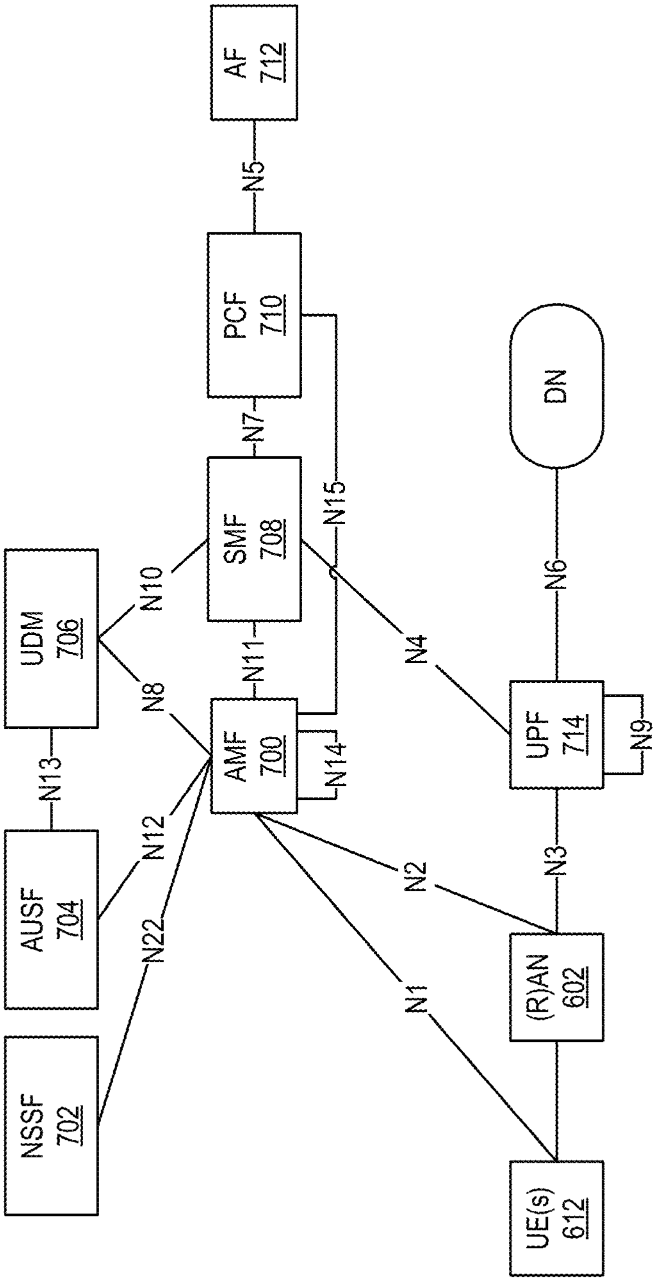
FIG. 7 illustrates a wireless communication system represented as a 5$^{th}$ Generation (5G) network architecture composed of core Network Functions (NFs), where interaction between any two NFs is represented by a point-to-point reference point/interface.

FIG. 7 illustrates a wireless communication system represented as a 5G network architecture composed of core Network Functions (NFs), where interaction between any two NFs is represented by a point-to-point reference point/interface. FIG. 7 can be viewed as one particular implementation of the system 600 of FIG. 6.

Seen from the access side the 5G network architecture shown in FIG. 7 comprises a plurality of UEs 612 connected to either a RAN 602 or an Access Network (AN) as well as an AMF 700. Typically, the R (AN) 602 comprises base stations, e.g., such as eNBs or gNBs or similar. Seen from the core network side, the 5GC NFs shown in FIG. 7 include a NSSF 702, an AUSF 704, a UDM 706, the AMF 700, a SMF 708, a PCF 710, and an Application Function (AF) 712.

Reference point representations of the 5G network architecture are used to develop detailed call flows in the normative standardization. The N1 reference point is defined to carry signaling between the UE 612 and AMF 700. The reference points for connecting between the AN 602 and AMF 700 and between the AN 602 and UPF 714 are defined as N2 and N3, respectively. There is a reference point, N11, between the AMF 700 and SMF 708, which implies that the SMF 708 is at least partly controlled by the AMF 700. N4 is used by the SMF 708 and UPF 714 so that the UPF 714 can be set using the control signal generated by the SMF 708, and the UPF 714 can report its state to the SMF 708. N9 is the reference point for the connection between different UPFs 714, and N14 is the reference point connecting between different AMFs 700, respectively. N15 and N7 are defined since the PCF 710 applies policy to the AMF 700 and SMF 708, respectively. N12 is required for the AMF 700 to perform authentication of the UE 612. N8 and N10 are defined because the subscription data of the UE 612 is required for the AMF 700 and SMF 708.

The 5GC network aims at separating User Plane (UP) and Control Plane (CP). The UP carries user traffic while the CP carries signaling in the network. In FIG. 7, the UPF 714 is in the UP and all other NFs, i.e., the AMF 700, SMF 708, PCF 710, AF 712, NSSF 702, AUSF 704, and UDM 706, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 700 and SMF 708 are independent functions in the CP. Separated AMF 700 and SMF 708 allow independent evolution and scaling. Other CP functions like the PCF 710 and AUSF 704 can be separated as shown in FIG. 7. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 8:
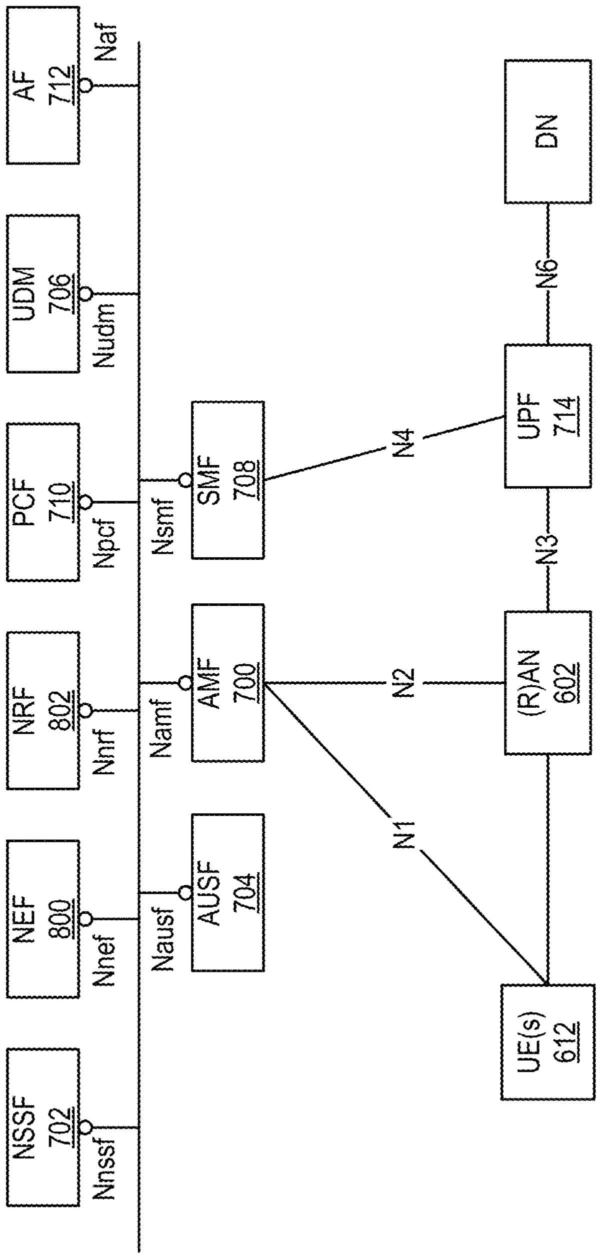
FIG. 8 illustrates a 5G network architecture using service-based interfaces between the NFs in the control plane, instead of the point-to-point reference points/interfaces used in the 5G network architecture of FIG. 7.

FIG. 8 illustrates a 5G network architecture using service-based interfaces between the NFs in the CP, instead of the point-to-point reference points/interfaces used in the 5G network architecture of FIG. 7. However, the NFs described above with reference to FIG. 7 correspond to the NFs shown in FIG. 8. The service(s) etc. that a NF provides to other authorized NFs can be exposed to the authorized NFs through the service-based interface. In FIG. 8 the service based interfaces are indicated by the letter "N" followed by the name of the NF, e.g., Namf for the service based interface of the AMF 700 and Nsmf for the service based interface of the SMF 708, etc. The NEF 800 and the NRF 802 in FIG. 8 are not shown in FIG. 7 discussed above. However, it should be clarified that all NFs depicted in FIG. 7 can interact with the NEF 800 and the NRF 802 of FIG. 8 as necessary, though not explicitly indicated in FIG. 7.

Some properties of the NFs shown in FIGS. 7 and 8 may be described in the following manner. The AMF 700 provides UE-based authentication, authorization, mobility management, etc. A UE 612 even using multiple access technologies is basically connected to a single AMF 700 because the AMF 700 is independent of the access technologies. The SMF 708 is responsible for session management and allocates Internet Protocol (IP) addresses to UEs. It also selects and controls the UPF 714 for data transfer. If a UE 612 has multiple sessions, different SMFs 708 may be allocated to each session to manage them individually and possibly provide different functionalities per session. The AF 712 provides information on the packet flow to the PCF 710 responsible for policy control in order to support QoS. Based on the information, the PCF 710 determines policies about mobility and session management to make the AMF 700 and SMF 708 operate properly. The AUSF 704 supports authentication function for UEs or similar and thus stores data for authentication of UEs or similar while the UDM 706 stores subscription data of the UE 612. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The present disclosure relates to the NWDAF registration, discovery, selection, monitoring, and re-selection in the two DML/FL phases, i.e., DML/FL preparation and execution phases. Embodiments related to NWDAF registration, discovery, and selection during the preparation phase are described below in Section A. Embodiments related to monitoring and re-selection in the execution phase are described below in Section B.

Figure 9:
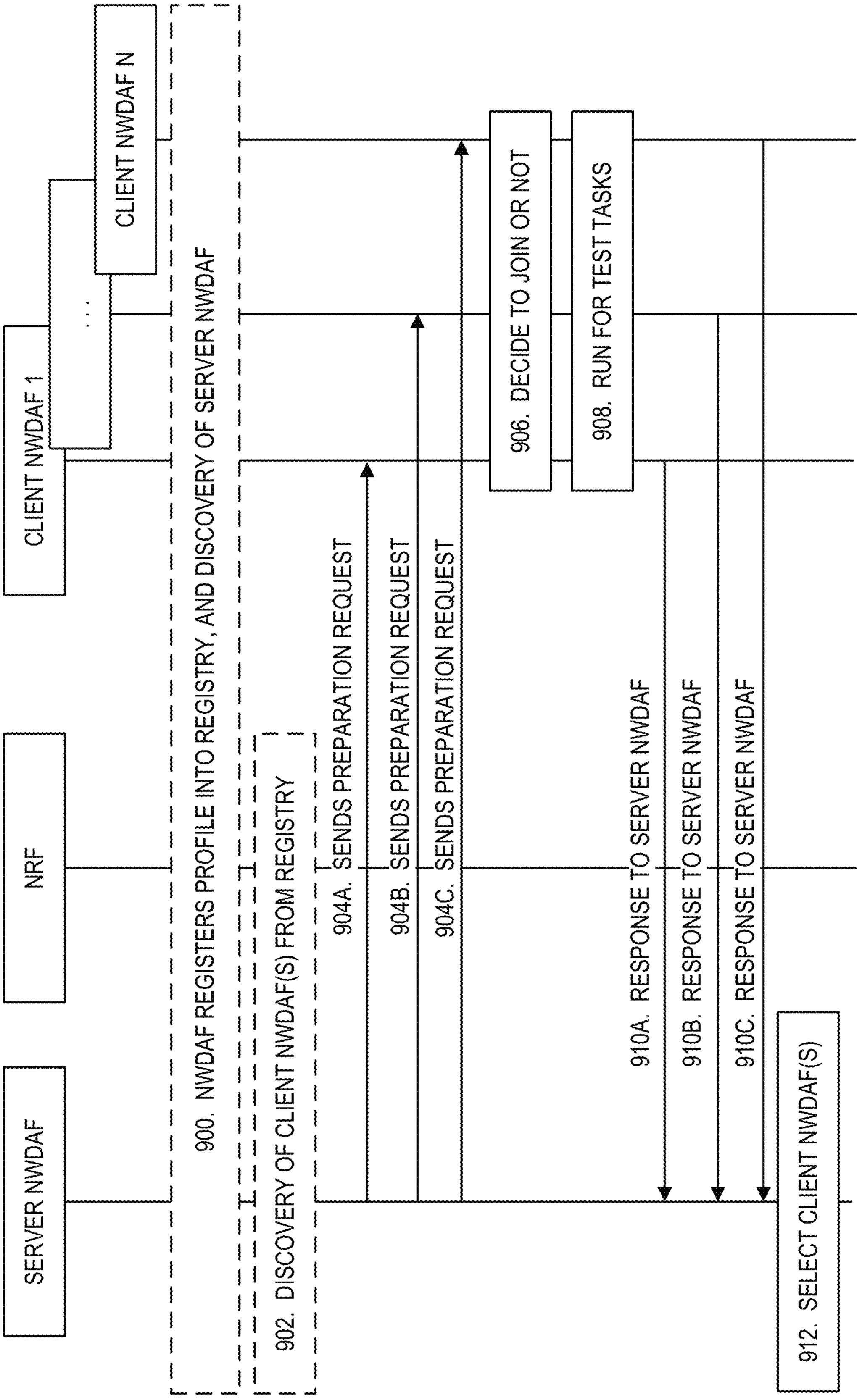
FIG. 9 illustrates the procedures of Network Data Analytics Functions (NWDAFs) registration, discovery, and Client NWDAF(s) selection in the Distributed Machine Learning (DML)/Federated Learning (FL) preparation phase, in accordance with an embodiment of the present disclosure.

A (Server and Client) NWDAFS Registration, Discovery, and Selection in DML/FL Prepereation Phase (as Shown in FIG. 9)

In the DML/FL preparation phase, NWDAF profiles are registered into a registry, e.g., NRF. Server and (potential) Client NWDAFs are discovered, and Client NWDAF(s) is (arc) selected by the method for handshake pattern. The Client NWDAF(s) selection is based on the availability, capability, and/or cost (e.g., resource consumption and energy consumption) of the Client NWDAF(s) for completing specific tasks.

In one embodiment, a method performed by a server NWDAF for selecting one or more client NWDAFs comprises transmitting, to a set of client NWDAFs, a request for preparing DML or FL; receiving, from the set of client NWDAFs, a response to the request for preparing DML or FL; and selecting (912) one or more client NWDAFs based on the response to the request for preparing DML or FL. In one embodiment, the method further comprises registering a profile of the server NWDAF into a registry. In one embodiment, the registry is a NRF. In one embodiment, the profile includes one or more of (a) a capability of computation and communication, (b) supported analytics identification(s), (c) ML relevant capability, (d) available data, or (c) availability to join in DML or FL. In one embodiment, the server NWDAF is discovered from the registry based on one of more of (i) a requirement on capability, (ii) a capability of model aggregation, (iii) a capability of processing and/or aggregating heterogenous model parameters, (iv) a capability to communication with other NWDAFs, (v) a capability of providing model to other NWDAFs or running models from other NWDAFs, of (vi) an indication of online or offline learning. In one embodiment, the method further comprises discovering the one or more client NWDAFs from the registry, based on one or more of (a) a requirement on capability, (b) an analytics identification, (c) an output strategy for intermediate results report during a training process, (d) a requirement on capability of processing intermediate ML models, results, and/or parameters, (e) a capability of running models from other NWDAFs, (f) an indication of online or offline learning, or (g) data source.

FIG. 9 illustrates the procedures of NWDAFs registration, discovery, and Client NWDAF(s) selection in the DML/FL preparation phase, in accordance with an embodiment of the present disclosure. There is interaction between a Server NWDAF and one or more Client NWDAFs for Client NWDAF(s) selection. The availability, capability, and/or cost (e.g., resource and energy consumptions) of the Client NWDAF(s) for completing specific tasks is considered during the selection process.

Steps 900 to 912 of the procedure for NWDAF registration and Client NWDAF(s) discovery and selection in FIG. 9 are described below.

Step 900: Optionally, NWDAFs (the Server NWDAF and the Client NWDAF(s)) each register a profile into a registry, e.g., NRF. In addition to other parameters, the following parameters may also be included in the registration information of the profile of an NWDAF:

- Capability of computation and communication
- Supported Analytics ID(s)
- ML relevant capability. Here, the ML relevant capability refers to the capability that the NWDAF(s) performs ML relevant operations itself or by applying/accessing tools/containers/platforms or other NFs, etc. The ML relevant capability may include:
  - Capability of model aggregation, or capability to access to tools;
  - Capability of processing and/or aggregating heterogenous model parameters;
  - Capability of split model for e.g., vertical FL, split neutral networks, etc.;
  - Send and/or receive intermediate ML models, results, parameters, etc.;
  - Capability of processing intermediate ML models, results, parameters, etc.;
  - Capability of providing model to other NWDAFs or running models from other NWDAFs;
  - Capability of online and/or offline learning
- Available data
- Availability to join in DML/FL, etc.

The Server NWDAF may be discovered by a NWDAF service consumer from the registry, e.g., NRF (by invoking the Nnrf_NFDiscovery_Request service operation). In addition to other parameters, the following parameters may also be included in the Server NWDAF discovery request:

- Requirement on capability, e.g., computation resource, communication resource, availability, etc.

- Analytics ID
- Capability of model aggregation
- Capability of processing and/or aggregating heterogenous model parameters
- Capability of split model for e.g., vertical FL, split neutral networks, etc.
- Output strategy for intermediate results report during training process, e.g., binary output strategy or gradient output strategy
- Capability to communication with other NWDAF(s) (e.g., Client NWDAF(s))
- Capability of providing model to other NWDAFs or running models from other NWDAFs
- Indication of online or offline learning The registry, e.g., NRF, responds to the NWDAF service consumer with the information of Server NWDAF(s). Alternately, Server NWDAF may be discovered according to pre-configuration.

Step 902: Optionally, the Server NWDAF discovers Client NWDAF(s) from the registry, e.g., NRF (by invoking the Nnrf_NFDiscovery_Request service operation). In addition to the parameters defined in the current specification for NWDAF discovery, the following parameters may also be included in the discovery request:

- Requirement on capability, e.g., computation resource, communication resource, etc.
- Analytics ID
- Output strategy for intermediate results report during training process, e.g., binary output strategy or gradient output strategy
- Requirement on capability of processing intermediate ML models, results, and/or parameters, etc.
- Capability of running models from other NWDAFs
- Indication of online or offline learning
- Data source, e.g., area of interest, data type, information of data provider (e.g., Analytics Data Repository Function (ADRF), etc.)

The registry, e.g., responds to the Server NWDAF with the information of Client NWDAF(s). In other words, the registry (e.g., NRF) sends a response to the Server NWDAF, where the response includes information that indicates one or more Client NWDAFs that satisfy the discovery request.

Alternately, the Server NWDAF discovers the Client NWDAF(s) according to pre-configuration.

Step 904: The Server NWDAF sends, to the Client NWDAF(s), DML/FL preparation request(s) with, for example, information on what model and meta data (e.g., weights), Analytics ID, data to use for training, test tasks. As illustrated in steps 904A, 904B, 904C of FIG. 9, as an example where there are three Client NWDAFs (the number of Client NWDAFs could be different in other scenarios), the Server NWDAF sends one DML/FL preparation request (with optional test tasks) to each of the Client NWDAFs. The test tasks may be micro computation or training tasks, where the requirement (e.g., on computation operation, accuracy, etc.) for completing the micro tasks is the same as or is similar to that of the main tasks, but the amount of computation and resource usage is only a small or tiny fraction of the main task. the preparation request may contain an indication of the role for the NWDAF(s), i.e., act as Client NWDAF(s).

The selection method of micro tasks is various for different learning architectures and algorithms. The selection of micro tasks is up to the Server NWDAF or other NFs or a 3$^{rd}$ party according to the requirement from the NWDAF Service Consumer, information on what model and meta data (e.g., weights) is to be used, Analytics ID, data to use for training, the learning architecture and algorithms, etc.

For DML/FL with a homogenous model at the Clients NWDAFs (e.g., horizontal FL, etc.), the same micro tasks may be sent to different Client NWDAFs. For DML/FL with heterogenous models at the Clients NWDAFs (e.g., vertical FL, etc.), different micro tasks may be sent to different Client NWDAFs.

Step 906: The Client NWDAF(s) decides whether to join the DML/FL process based on its:

- willingness and availability to join in the DML/FL, information about the DML/FL, e.g., DML/FL framework, ML model(s), model weights and/or parameters, etc., included in the DML/FL preparation request or in the test tasks description (which is sent from Server NWDAF to Client NWDAF(s) in step 904);
- available computation resources, communication resources, and energy capacity (e.g., power supply, battery capacity, etc.), etc.
- supported Analytics ID
- ML relevant capability (e.g., capability of intermediate models, results and/or parameters output, capability of processing intermediate models, results and/or parameters, capability of online or offline learning, etc.)
- available data, etc.

The information mentioned in the above bullets, i.e., information about the DML/FL, Analytics ID, requirements on ML relevant capability and available data, is included in the DML/FL preparation request or in the test tasks description (which is sent from Server NWDAF to Client NWDAF(s) in the above step 904).

If the Client NWDAF decides not to join the DML/FL process, it will send rejection message to the Server NWDAF.

Step 908: The Client NWDAF(s) that decide to join in the DML/FL starts to run the test tasks. For example, the test tasks may be included in the DML/FL preparation request received in step 904.

For DML/FL with homogenous model at the Clients NWDAFs (e.g., horizontal FL, etc.), the same micro tasks may be run for the test at different Client NWDAFs. For DML/FL with heterogenous models at Clients NWDAFs (e.g., vertical FL, etc.), different micro tasks may be run for the test at different Client NWDAFs.

Step 910: The Client NWDAF(s), which has run the test tasks (in step 908), transmit a response to the Server NWDAF with the results of running the test tasks.

Step 912: The Server NWDAF selects some NWDAF(s) from the Client NWDAF(s) based on the received results of running the test tasks (e.g., time and resource usage for completing the micro tasks (computation resource, cost (e.g., resource and energy consumptions), etc.), accuracy of the results, etc.).

Figure 10:
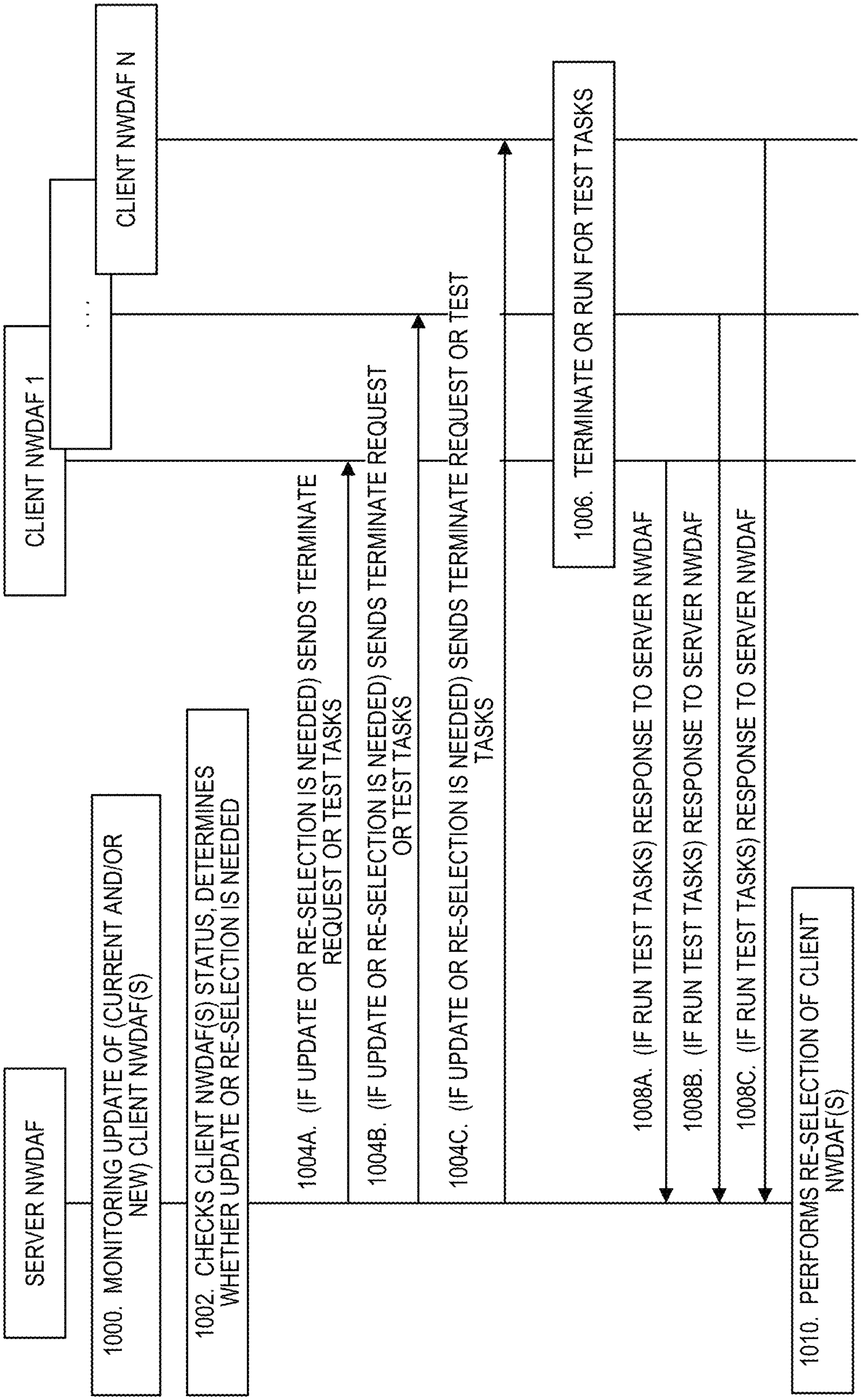
FIG. 10 illustrates a procedure of monitoring, and update or re-selection of Client NWDAF(s) in the DML/FL execution phase, in accordance with an embodiment of the present disclosure.

B Monitoring, and Update or Re-Selection of Client NWDAF(S) in DML/FL Execution Phase (as Shown in FIG. 10)

In the DML/FL execution phase, the Server NWDAF monitors the status changes of the Client NWDAF(s). The Client NWDAF(s) may be updated or re-selected based on the updated status, availability, and/or capability, etc., of the Client NWDAF(s) for completing specific tasks.

FIG. 10 illustrates a procedure of monitoring, and update or re-selection of Client NWDAF(s) in the DML/FL execution phase. There may be interaction between Server NWDAF and Client NWDAF(s) (one or more NWDAFs) for monitoring and re-selection. The updated status, availability, capability, and/or cost (e.g., resource and energy consumptions) of Client NWDAF(s) are considered during the re-selection process.

Steps 1000-1010 of FIG. 10 for the procedure for Server NWDAF monitoring, and Client NWDAF(s) updating or re-selection are described below.

Step 1000: The Server NWDAF performs monitoring of the status of the Client NWDAF(s) during the DML/FL execution process, and receives updated statuses of the Client NWDAF(s). The updated status of the Client NWDAF(s) may include:

- changes of willingness and availability, e.g., Client NWDAF(s) leaves the current DML/FL
- changes of ML relevant capability (NWDAF(s) perform ML relevant operations itself or by applying/accessing to tools/containers/platforms or other NFs, etc.), the changes may include:
  - changes of intermediate output policy
  - changes of intermediate ML model, results, and/or parameters capability
  - changes of online or offline learning capability
- changes of supported Analytics ID
- changes of the available computation resource (e.g., processing, calculation resources, etc.)
- (optional) changes of computation capability (e.g., speed, accuracy, etc.)
- changes of communication quality (e.g., latency, throughput, etc.)
  - The changes of communication quality may be due to delay, collision, congestion, changed communication condition and environment, etc.
- changes of the available energy, etc.
- changes of data availability, etc.

In step 1000, the Server NWDAF may perform monitoring and obtain the updated status of the Client NWDAF(s):

- directly
  - The Client NWDAF(s) updates status to the Server NWDAF directly; or
  - The Server NWDAF performs analytics on the Client NWDAF(s) for the Analytics ID, e.g., NF load analytics, etc.
- via NRF
  - The Server NWDAF subscribes to an NRF for changes of Client NWDAF(s) status. The Client NWDAF(s) updates status to the NRF, and the NRF pushes the updated status of the Client NWDAF(s) to the Server NWDAF.
- via another NF (e.g., NWDAF)
  - The Server NWDAF subscribes to another NF (e.g., NWDAF) on the changes of the Client NWDAF(s) for Analytics ID, e.g., NF load analytics, etc. The (another) NF (e.g., NWDAF) performs analytics on the Client NWDAF(s) and notifies the results of the analytics to the Server NWDAF.

Step 1002: The Server NWDAF checks the Client NWDAF(s) status based on the received information, determines whether update or re-select Client NWDAF(s) for the next round(s) of DML/FL is needed. The determination is based on the updated status of the Client NWDAF(s), including the willingness and availability, capability, etc., and the following conditions:

- Condition 1: No (current) Client NWDAF(s) choose(s) to leave the DML/FL.
- Condition 2: The availability of (some of) the current Client NWDAF(s) is changed to leave the DML/FL.
- Condition 3: The training tasks could be completed in required time and the requirements from the NWDAF service consumer (NF/AF/OAM) could be satisfied and provided by (the rest of) the current Client NWDAF(s).

Conditions 1 and 2 cannot be satisfied at the same time.

- If the Conditions 1 and 3 are satisfied, there is no need for update or re-selection of Client NWDAF(s).
- If the Conditions 2 and 3 are satisfied, update of Client NWDAF(s) is needed.
- If the Condition 3 cannot be satisfied, re-selection of Client NWDAF(s) is needed.

Step 1004. When the updating or re-selection is needed (as determined in the above step 1002), Server NWDAF checks the willingness and availability and/or capability of the (current and/or new) Client NWDAF(s):

- For update of Client NWDAF(s): Server NWDAF sends terminates request to the Client NWDAF(s) which is willing to leave.
- For re-selection of Client NWDAF(s): Server redo the client NWDAF discovery via NRF as step 902 in FIG. 9. Then NWDAF sends DML/FL preparation request with test task to the newly discovered client NWDAF. If there is no new client NWDAF discovered, then the server NWDAF may determine that the DML/FL learning cannot continue and send the model notification to the consumer with the DML/FL status, e.g., how much DML/FL is progressed, the current model accuracy, etc., as well as the cause why the DML/FL is terminated.

The selection method of micro tasks is various for different learning architecture and algorithms. The selection of micro tasks is completed at Server NWDAF or other NFs, or 3rd party according to the requirement from Consumer, information on what model and meta data (e.g., weights), Analytics ID, data to use for training, and the learning architecture and algorithms, etc.

For DML/FL with homogenous model at Clients NWDAFs (e.g., horizontal FL, etc.), same micro tasks may be sent to different Client NWDAFs. For DML/FL with heterogenous models at Clients NWDAFs (e.g., vertical FL, etc.), different micro tasks may be sent to different Client NWDAFs.

Step 1006: The Client NWDAF(s) terminates operations for the DML/FL or runs test tasks.

- If received terminate request from Server NWDAF, Client NWDAF(s) terminates operations for the DML/FL execution phase, and updates to the registry, e.g., NRF.
- If received test tasks from Server NWDAF, Client NWDAF(s) (which has the availability to join the DML/FL process) run for the test tasks. Here, the Client NWDAFs refers to the ones which Server NWDAF newly discovered via NRF, and the ones which have participated in previous rounds of training and have the availability to continue to join the DML/FL process.

Step 1008: The Client NWDAF(s), which has run the test tasks (in Step 4.), transmit responses to the Server NWDAF with the running results of the test tasks.

Step 1010: The Server NWDAF re-selects the Client NWDAF(s) based on the received running results of the test tasks (e.g., matchiness, time and resource usage for completing the micro tasks (computation resource, energy, cost (e.g., resource and energy consumptions), etc.), accuracy of the results, etc.) and the current DML/FL status.

Figure 11:
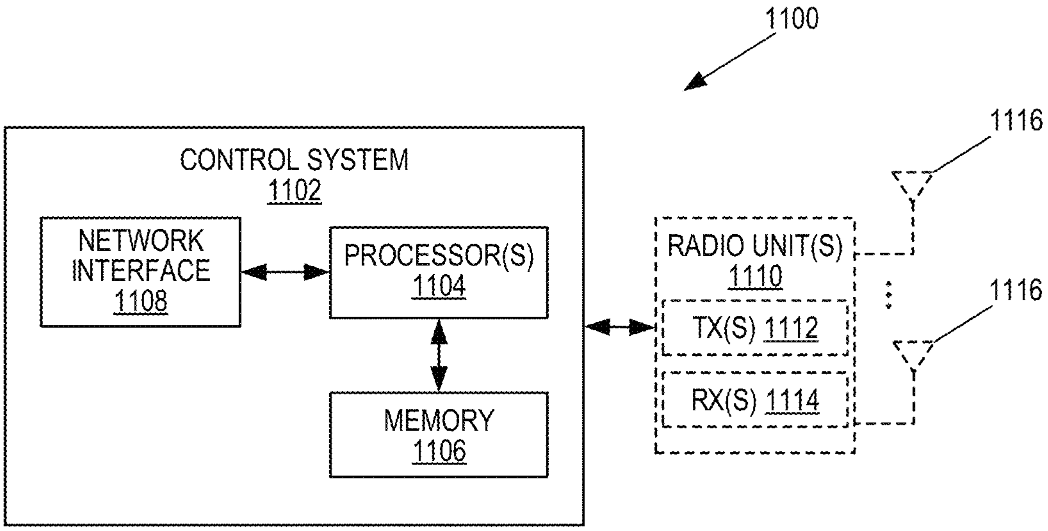
FIGS. 11, 12, and 13 are schmtic block diagrams of example embodiments of a network node.

FIG. 11 is a schematic block diagram of a network node 1100, which implements the server NWDAF, the client NWDAF, or the NRF, according to some embodiments of the present disclosure. Optional features are represented by dashed boxes. As illustrated, the network node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the network node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a network node 1100 as described herein. In some embodiments, the function(s) are implemented in software that is stored, e.g., in the memory 1106 and executed by the one or more processors 1104.

Figure 12:
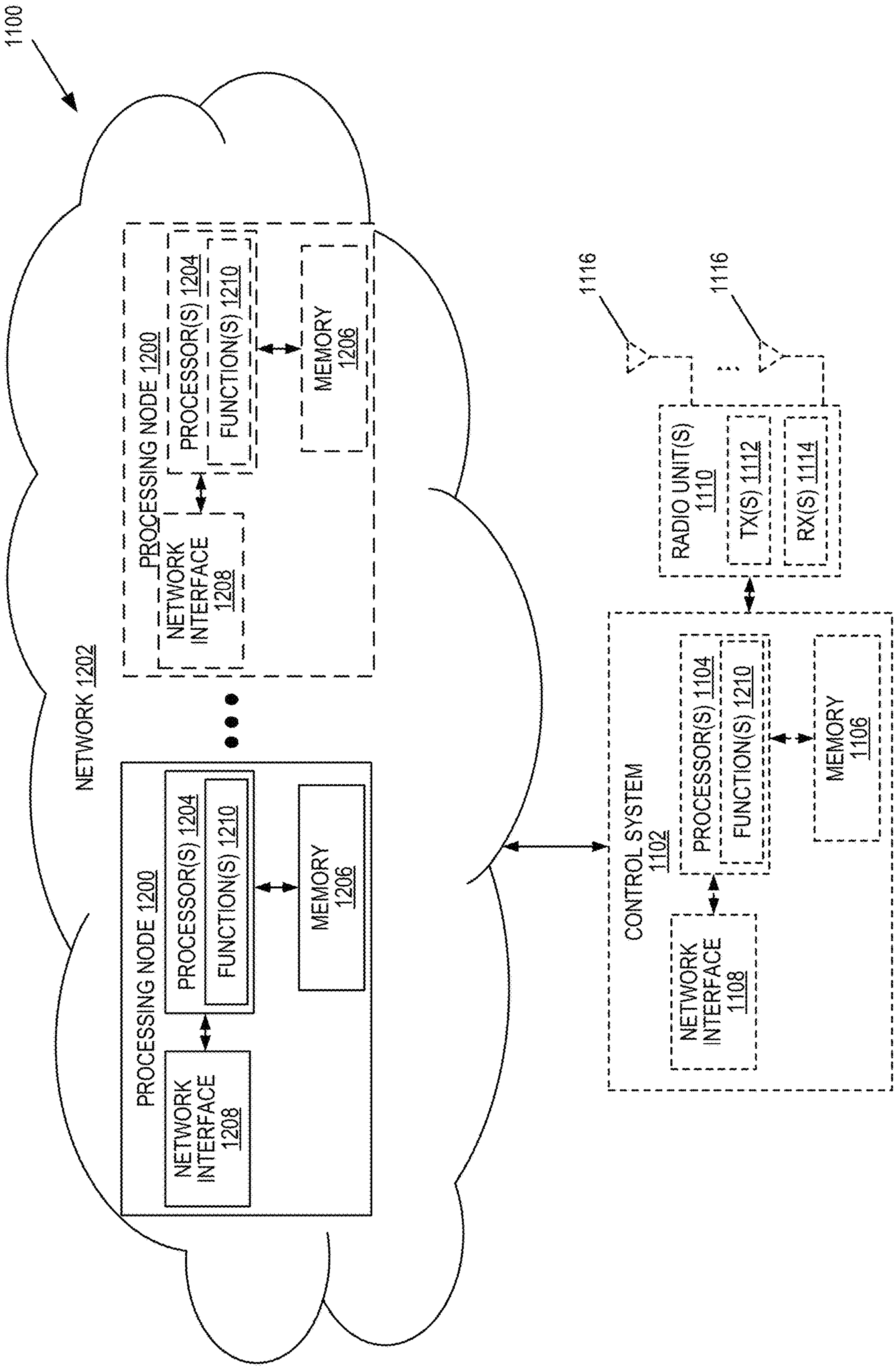

FIG. 12 is a schematic block diagram that illustrates a virtualized embodiment of the network node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 1100 in which at least a portion of the functionality of the network node 1100 is implemented as a virtual component(s) (e.g., via a virtual machine(s) executing on a physical processing node(s) in a network(s)). As illustrated, in this example, the network node 1100 may include the control system 1102 and/or the one or more radio units 1110, as described above. The control system 1102 may be connected to the radio unit(s) 1110 via, for example, an optical cable or the like. The network node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the network node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the network node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of network node 1100 or a node (e.g., a processing node 1200) implementing one or more of the functions 1210 of network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
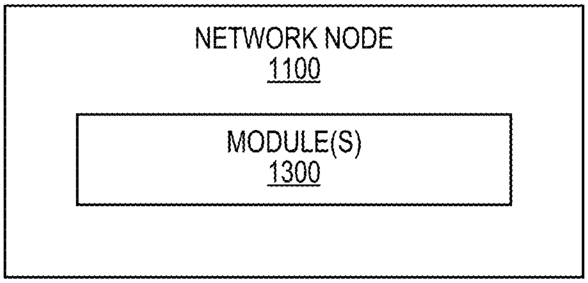

FIG. 13 is a schematic block diagram of the network node 1100 according to some other embodiments of the present disclosure. The network node 1100 includes one or more modules 1300, each of which is implemented in software. The module(s) 1300 provide the functionality of the network node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a server Network Data Analytics Function, NWDAF, for selecting one or more client NWDAFs, the method comprising:
- transmitting (904), to a set of client NWDAFs, a request for preparing Distributed Machine Learning, DML, or Federated Learning, FL;
- receiving (910), from the set of client NWDAFs, a response to the request for preparing DML or FL; and
- selecting (912) one or more client NWDAFs based on the response to the request for preparing DML or FL.

Embodiment 2: The method of embodiment 1, further comprising registering (900) a profile of the server NWDAF into a registry.

Embodiment 3: The method of embodiment 2, wherein the registry is a Network Repository Function, NRF.

Embodiment 4: The method of embodiment 2, wherein the profile includes one or more of (a) a capability of computation and communication, (b) supported analytics identification(s), (c) Machine Learning, ML, relevant capability, (d) available data, or (e) availability to join in DML or FL.

Embodiment 5: The method of any of embodiments 2 to 4, wherein the server NWDAF is discovered from the registry based on one of more of (i) a requirement on capability, (ii) a capability of model aggregation, (iii) a capability of processing and/or aggregating heterogenous model parameters, (iv) a capability to communication with other NWDAFs, (v) a capability of providing model to other NWDAFs or running models from other NWDAFs, of (vi) an indication of online or offline learning.

Embodiment 6: The method of any of embodiments 2 to 5, further comprising discovering (902) the one or more client NWDAFs from the registry, based on one or more of (a) a requirement on capability, (b) an analytics identification, (c) an output strategy for intermediate results report during a training process, (d) a requirement on capability of processing intermediate ML models, results, and/or parameters, (c) a capability of running models from other NWDAFs, (f) an indication of online or offline learning, or (g) data source.

Embodiment 7: A method performed by a client Network Data Analytics Function, NWDAF, for exchanging signals with a server NWDAF, the method comprising:
- receiving (904), from the server NWDAF, a request for preparing Distributed Machine Learning, DML, or Federated Learning, FL;
- deciding (906) whether to join the DML or FL based on one or more parameters;
- performing (908) a running of one or more test tasks related to the DML or FL when the client NWDAF decides to join the DML or FL; and
- sending (910), to the server NWDAF, a result of the running of the one or more test tasks.

Embodiment 8: The method of embodiment 7, wherein the one or more test tasks are included in the request for preparing DML or FL.

Embodiment 9: The method of embodiment 7 or 8, wherein the one or more test tasks are micro computation tasks or training tasks.

Embodiment 10: The method of any of embodiments 7 to 9, wherein on one or more parameters are (a) willingness and availability to join in the DML or FL, (b) information of the DML or FL, (c) available computation resource, communication resource, and energy, (d) supported analytics identification, (e) Machine Learning, ML, relevant capability, or (f) available data.

Embodiment 11: A method performed by a server Network Data Analytics Function, NWDAF, for performing a reselection of one or more client NWDAFs, the method comprising:
- monitoring (1000) update status of the one or more client NWDAFs by receiving one or more status information;
- determining (1002) whether a reselection of any of the one or more client NWDAFs is needed based on the updated status of the first set of client NWDAFs;
- sending (1004), to the one or more client NWDAFs, terminate requests or testing tasks when the reselection of any of the one or more client NWDAFs is determined to be needed;
- receiving (1008), from the one or more client NWDAFs, responses including running results of the test tasks; and
- performing (1010) a reselection of some of the one or more client NWDAFs based on the received results of the test tasks.

Embodiment 12: The method of embodiment 11, wherein the one or more status information comprises (i) changes of willingness and availability, (ii) changes of ML relevant capability, (iii) changes of supported analytics identification, (iv) changes of the available computation resource, (v) changes of computation capability, (vi) changes of communication quality, (vii) changes of the available energy, or (viii) changes of data availability.

Embodiment 13: A method performed by a client Network Data Analytics Function, NWDAF, for exchanging signals with a server NWDAF, the method comprising:
- receiving (1004), from the server NWDAF, a terminate request or a testing task; and
- transmitting (1008), to the server NWDAF, a response including a running result of the test task.

Those skilled in the art will recognize improvements and modifications to the embodiments of the present disclosure. All such improvements and modifications are considered within the scope of the concepts disclosed herein.

The invention claimed is:

1. A method performed by a server Network Data Analytics Function, NWDAF, the method comprising:
- transmitting, to each of a set of client NWDAFs, a preparation request for Distributed Machine Learning, DML, or Federated Learning, FL;
- receiving, from each of at least some of the set of client NWDAFs, a response to the preparation request for DML or FL, wherein the response to the preparation request comprises a result of performing one or more test tasks at the client NWDAF, wherein the preparation request for DML or FL comprises the one or more test tasks, and wherein the one or more test tasks are performed at the client NWDAF in response to the preparation request;
- selecting one or more client NWDAFs based on the responses to the preparation requests for DML or FL;
- during an execution phase of DML or FL between the server NWDAF and the one or more client NWDAFs:
  - monitoring an updated status of each of the one or more client NWDAFs;
  - determining whether reselection of client NWDAFs is needed based on the updated statuses of the one or more client NWDAFs; and
  - performing reselection of client NWDAFs responsive to determining that reselection of client NWDAFs is needed.

2. The method of claim 1, further comprising registering a profile of the server NWDAF into a registry.

3. The method of claim 2, wherein the registry is a Network Repository Function, NRF.

4. The method of claim 2, wherein the profile comprises any one or more of: (a) a capability of computation and communication, (b) supported analytics identification(s), (c) Machine Learning, ML, relevant capability, (d) available data, or (e) availability to join in DML or FL.

5. The method of claim 2, wherein the server NWDAF is discovered from the registry based on one of more of (i) a requirement on capability, (ii) a capability of model aggregation, (iii) a capability of processing or aggregating heterogenous model parameters, (iv) a capability to communication with other NWDAFs, (v) a capability of providing model to other NWDAFs or running models from other NWDAFs, of (vi) an indication of online or offline learning.

6. The method of claim 2, further comprising discovering the set of client NWDAFs from the registry, based on any one or more of: (a) a requirement on capability, (b) an analytics identification, (c) an output strategy for intermediate results report during a training process, (d) a requirement on capability of processing intermediate ML models, results, or parameters, (e) a capability of running models from other NWDAFs, (f) an indication of online or offline learning, or (g) data source.

7. The method of claim 1, wherein the result of performing the one or more test tasks at the client NWDAF comprises time and resource usage for completing the one or more test tasks, resource and energy consumption for completing the one or more test tasks, accuracy, or any combination of two or more thereof.

8. The method of claim 1, wherein:

the updated status of at least one client NWDAF from among the one or more client NWDAFs indicates that the at least one client NWDAF chooses to leave the DML or FL or is not available for the DML or FL; and performing reselection of client NWDAFs comprises sending, to the at least one client NWDAF, a terminate request.

9. The method of claim 8, wherein performing reselection of client NWDAFs further comprises performing client NWDAF discovery for discovery of one or more new client NWDAFs.

10. The method of claim 9, wherein performing client NWDAF discovery for discovery of one or more new client NWDAFs comprises:

transmitting, to each of a new set of client NWDAFs, a new preparation request for DML or FL;

receiving, from each of at least some of the new set of client NWDAFs, a response to the new preparation request for DML or FL; and selecting the one or more new client NWDAFs from the new set of client NWDAFs based on the responses to the new preparation requests for DML or FL.

11. The method of claim 10, wherein the response to the new preparation request comprises a result of performing one or more new test tasks at the client NWDAF.

12. The method of claim 11, wherein the new preparation request for DML or FL comprises the one or more new test tasks, and wherein the one or more new test tasks are performed at the client NWDAF in response to the new preparation request.

13. The method of claim 11, wherein the result of performing the one or more new test tasks at the client NWDAF comprises time and resource usage for completing the one or more new test tasks, resource and energy consumption for completing the one or more new test tasks, accuracy, or any combination of two or more thereof.

14. The method of claim 1, wherein each of the updated statuses comprises any one or more of: (i) change of willingness and availability, (ii) change of ML relevant capability, (iii) change of supported analytics identification, (iv) change of the available computation resource, (v) change of computation capability, (vi) change of communication quality, (vii) change of the available energy, or (viii) change of data availability.

15. The method of claim 1, wherein monitoring the updated status of each of the one or more client NWDAFs comprises receiving the updated status of each of the one or more client NWDAFs from a Network Repository Function, NRF, or NWDAF.

16. The method of claim 1, wherein the preparation request comprises information on a model and data to be used by the client NWDAF for performing the one or more test tasks.

17. The method of claim 1, wherein the one or more test tasks comprise a micro task, wherein a requirement for completing the micro task is the same as a requirement for completing a main task, and an amount of computation and resource usage for completing the micro task is less than an amount of computation and resource usage for completing the main task.

18. A network node for implementing a server Network Data Analytics Function, NWDAF, the network node comprising processing circuitry configured to cause the network node to:

transmit, to each of a set of client NWDAFs, a preparation request for Distributed Machine Learning, DML, or Federated Learning, FL;

receive from each of at least some of the set of client NWDAFs, a response to the preparation request for DML or FL, wherein the response to the preparation request comprises a result of performing one or more test tasks at the client NWDAF, wherein the preparation request for DML or FL comprises the one or more test tasks, and wherein the one or more test tasks are performed at the client NWDAF in response to the preparation request; and select one or more client NWDAFs based on the responses to the preparation requests for DML or FL;

during an execution phase of DML or FL between the server NWDAF and the one or more client NWDAFs:

monitor an updated status of each of the one or more client NWDAFs;

determine whether reselection of client NWDAFs is needed based on the updated statuses of the one or more client NWDAFs; and perform reselection of client NWDAFs responsive to determining that reselection of client NWDAFs is needed.

* * * * *